US012764375B2

(12) United States Patent
Kerofsky et al.

(10) Patent No.: US 12,764,375 B2
(45) **Date of Patent: *Oct. 13, 2026**

(54) TRACKED VIDEO ZOOMING

(71) Applicant: InterDigital VC Holdings, Inc., Wilmington, DE (US)

(72) Inventors: Louis Kerofsky, San Diego, CA (US); Eduardo Asbun, Santa Clara, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/200,576

(22) Filed: May 6, 2025

(65) Prior Publication Data

US 2025/0392778 A1 Dec. 25, 2025

Related U.S. Application Data

(63) Continuation of application No. 16/642,628, filed as application No. PCT/US2018/047731 on Aug. 23, 2018, now Pat. No. 12,323,651.

(Continued)

(51) Int. Cl.
*H04N 21/431* (2011.01)
*H04N 5/45* (2011.01)
(Continued)

(52) U.S. Cl.
CPC ........... *H04N 21/4316* (2013.01); *H04N 5/45* (2013.01); *H04N 21/44008* (2013.01); *H04N 21/4728* (2013.01)

(58) Field of Classification Search
CPC ................. H04N 21/4316; H04N 5/45; H04N 21/44008; H04N 21/4728; H04N 21/4312
See application file for complete search history.

(56) References Cited

U.S. PATENT DOCUMENTS 5,852,474 A * 12/1998 Nakagaki ............... H04N 5/445 348/E5.099
5,861,994 A * 1/1999 Kelly .................. G02B 27/017 348/E5.025

(Continued)

FOREIGN PATENT DOCUMENTS

CN 1758714 A 4/2006
CN 1960479 A 5/2007

(Continued)

OTHER PUBLICATIONS

Allen, et al., "Object Tracking using Camshift Algorithm and Multiple Quantized Feature Spaces", Proceedings of the Pan-Sydney area workshop on Visual information processing, Australian Computer Society, Inc., Jun. 2004, pp. 3-7.

(Continued)

*Primary Examiner* — Sihar A Karwan
(74) *Attorney, Agent, or Firm* — Condo Roccia Koptiw LLP

(57) ABSTRACT

Systems, methods, and instrumentalities are disclosed for dynamic picture-in-picture (PIP) by a client. The client may reside on any device. The client may receive video content from a server, and identify an object within the video content using at least one of object recognition or metadata. The metadata may include information that indicates a location of an object within a frame of the video content. The client may receive a selection of the object by a user, and determine positional data of the object across frames of the video content using at least one of object recognition or metadata. The client may display an enlarged and time-delayed version of the object within a PIP window across the frames of the video content. Alternatively or additionally, the location of the PIP window within each frame may be fixed or may be based on the location of the object within each frame.

20 Claims, 22 Drawing Sheets

Related U.S. Application Data

(60) Provisional application No. 62/552,032, filed on Aug. 30, 2017.

(51) Int. Cl.
*H04N 21/44* (2011.01)
*H04N 21/4728* (2011.01)

(56) References Cited

U.S. PATENT DOCUMENTS 7,907,153 B2* 3/2011 Kuroki ..................... H04N 5/45 345/204
8,164,690 B2* 4/2012 Fukui ..................... H04N 21/812 348/739
8,331,760 B2* 12/2012 Butcher ......... H04N 21/234318 382/256
8,358,907 B2* 1/2013 Inagaki .............. H04N 21/4316 386/239
8,502,856 B2* 8/2013 Cranfill ................. G06F 3/0486 348/14.02
8,803,873 B2* 8/2014 Yoo ...................... H04N 21/812 715/848
8,896,672 B2* 11/2014 Lee ...................... H04N 13/356 715/848
9,020,259 B2* 4/2015 Bhagavathy ........... G06V 20/40 382/165
9,082,018 B1* 7/2015 Laska .............. G08B 13/19606
9,137,562 B2* 9/2015 Schmouker ...... H04N 21/47205
9,250,927 B2* 2/2016 Jung .................. H04N 21/4345
9,266,017 B1* 2/2016 Parker ..................... A63F 13/77
9,288,545 B2* 3/2016 Hill .................... H04N 21/4312
9,386,295 B2* 7/2016 Lee ...................... H04N 13/194
9,417,754 B2* 8/2016 Smith ..................... G06F 3/048
9,467,648 B2* 10/2016 Kwon .................... H04N 5/272
9,554,084 B2* 1/2017 Lee .................... H04N 21/4728
9,554,133 B2* 1/2017 Ye ........................ H04N 19/105
9,571,734 B2* 2/2017 Kwak .................... G06F 3/1423
9,615,062 B2* 4/2017 Sablak ............. H04N 21/47202
9,648,269 B2* 5/2017 Park ............... H04N 21/440263
9,681,165 B1* 6/2017 Gupta .............. H04N 21/44008
10,019,782 B2* 7/2018 Yeo ......................... H04H 60/80
10,375,312 B2* 8/2019 Choi .......................... G06T 7/20
10,459,532 B2* 10/2019 Hirata ................. G06F 3/04812
2001/0030667 A1* 10/2001 Kelts ..................... G06F 16/444 715/854
2003/0083786 A1* 5/2003 Pietrowicz .......... H02J 13/1313 700/286
2004/0032495 A1* 2/2004 Ortiz ..................... H04L 69/329 348/42
2004/0037355 A1* 2/2004 Allie ...................... H04N 19/85 375/240.26
2005/0151885 A1* 7/2005 Choi ......................... G06T 3/40 348/565
2006/0045381 A1* 3/2006 Matsuo .................. H04N 19/61 375/E7.145
2006/0061602 A1* 3/2006 Schmouker ........ H04N 21/4858 348/E5.103
2007/0086669 A1* 4/2007 Berger ................. G06V 10/235 382/243
2007/0191098 A1* 8/2007 An ................... H04N 21/47202 463/40
2008/0060020 A1* 3/2008 Kelts .................. H04N 21/4318 725/56
2008/0215172 A1* 9/2008 Digon .................. G11B 27/105
2009/0028440 A1* 1/2009 Elangovan ............. H04N 5/272 382/103
2009/0067723 A1* 3/2009 Yamazaki .......... H04N 21/4316 348/E5.062
2009/0249404 A1* 10/2009 Chen .................... G11B 27/105 725/58
2010/0026721 A1* 2/2010 Park ......................... G09G 5/14 345/660
2010/0174421 A1* 7/2010 Tsai .................... G06F 3/04815 715/764
2011/0126106 A1* 5/2011 Ben Shaul ............. G11B 27/34 715/723
2011/0271227 A1* 11/2011 Takahashi .......... H04N 21/2343 715/800
2011/0299832 A1* 12/2011 Butcher ............. H04N 21/8547 348/E5.062
2011/0304627 A1* 12/2011 Kegel .................. G11B 27/322 345/440
2012/0039400 A1* 2/2012 Rieken .............. H04L 25/03159 375/257
2012/0236008 A1* 9/2012 Yamada .................. G06T 13/00 345/473
2013/0268196 A1* 10/2013 Dam ....................... G01W 1/10 702/3
2014/0002580 A1* 1/2014 Bear .................. H04N 21/4312 348/E7.083
2014/0079126 A1* 3/2014 Ye ........................ H04N 19/105 375/240.16
2014/0218611 A1* 8/2014 Park ................... H04N 21/4316 348/565
2015/0062434 A1* 3/2015 Deng ............. H04N 21/440263 348/565
2015/0179219 A1* 6/2015 Gao ....................... G06V 10/24 386/278
2015/0268822 A1* 9/2015 Waggoner .......... H04N 21/4728 715/722
2016/0057508 A1* 2/2016 Borcherdt .......... H04N 21/2353 715/719
2016/0381289 A1* 12/2016 Kim ....................... H04N 23/69 348/38
2017/0094184 A1* 3/2017 Gao ........................ G06T 7/337
2017/0147174 A1* 5/2017 Olejniczak ......... H04N 21/4223
2017/0201686 A1* 7/2017 Choi .................... H04N 23/631
2017/0302719 A1* 10/2017 Chen ....................... H04L 65/61
2018/0035136 A1* 2/2018 Crowe ............ H04N 21/47211
2018/0262708 A1* 9/2018 Lee .................... H04N 21/4728
2019/0172177 A1* 6/2019 Edmonds ......... H04N 21/43637

FOREIGN PATENT DOCUMENTS

| | | | |
|---|---|---|---|
| CN | 101170683 | A | 4/2008 |
| CN | 102014248 | A | 4/2011 |
| CN | 102106145 | A | 6/2011 |
| CN | 103826095 | A | 5/2014 |
| CN | 103886322 | A | 6/2014 |
| CN | 106204653 | A | 12/2016 |
| CN | 106384359 | A | 2/2017 |
| CN | 106416223 | A | 2/2017 |
| CN | 107066990 | A | 8/2017 |
| JP | H09-65225 | A | 3/1997 |
| JP | 2006-087098 | A | 3/2006 |
| JP | 2006-099404 | A | 4/2006 |
| JP | 2009-069185 | A | 4/2009 |
| JP | 2016-538601 | A | 12/2016 |
| JP | 2017-508192 | A | 3/2017 |
| KR | 10-2008-0010633 | A | 1/2008 |
| RU | 2015102840 | A | 8/2016 |
| RU | 2602778 | C2 | 11/2016 |
| WO | 2015/197815 | A1 | 12/2015 |
| WO | 2016/014537 | A1 | 1/2016 |
| WO | 2016/186254 | A1 | 11/2016 |
| WO | 2017/058665 | A1 | 4/2017 |

OTHER PUBLICATIONS

Exner, et al., “Fast and Robust CAMShift Tracking”, IEEE, Computer Vision and Pattern Recognition Workshops (CVPRW), 2010, pp. 9-16.

ITU-T, “Advance Video Coding for Generic Audiovisual Services”, H.264, Series H: Audiovisual and Multimedia Systems, Infrastructure of Audiovisual Services—Coding of Moving Video, Nov. 2007, 564 pages.

(56) References Cited

OTHER PUBLICATIONS

ITU-T, "High Efficiency Video Coding", H.265-v2, Series H: Audiovisual and Multimedia Systems, Infrastructure of Audiovisual Services—Coding of Moving Video, Oct. 2014, 540 pages.
Lin, et al., "Outside-In: Visualizing Out-of-Sight Regions-of-Interest in a 360 Video Using Spatial Picture-in-Picture Previews", Available at <https://www.cmlab.csie.ntu.edu.tw/~robin/docs/uist17_lin.pdf>, Oct. 22-25, 2017, 11 pages.
Needham, et al., "Tracking Multiple Sports Players Through Occlusion, Congestion and Scale", Proceedings of the British Machine Vision Conference, Jan. 1, 2001, pp. 93-102.
Sanchez, et al., "Compressed Domain Video Processing for Tile Based Panoramic Streaming using SHVC", Immersive Media Experiences, ACM, Brisbane, Australia, Oct. 30, 2015, 6 pages.
Software RT, "How to Overlay Photos and Videos & Create Picture-in Picture Videos using Filmora?", Available at <https://www.softwarert.com/overlay-photos-videos-picture-in-picture-filmora/>, pp. 1-7.
Trang, "Video Overlay—Creating a Picture-in-Picture Effect", Available at <https://atomisystems.com/tutorials/ap7/video-overlay-creating-picture-in-picture-effect/>, Mar. 9, 2018, pp. 1-5.
Whitney, "LG Touts Zoom, On-Screen Remote in Upcoming Smart TVs", Available at <https://www.cnet.com/news/lg-touts-zoom-on-screen-remote-in-upcoming-smart-tvs/>, Dec. 22, 2015, pp. 1-2.
Wikipedia, "Mathematical Morphology", Available at <https://en.wikipedia.org/wiki/Mathematical_morphology>, pp. 1-9.
Zebra & The NFL, "Official On-Field Player-Tracking", Available at <https://www.zebra.com/us/en/nfl.html>, pp. 1-5.

* cited by examiner

400

410

800

900

1000

TRACKED VIDEO ZOOMING

CROSS-REFERENCE TO RELATED APPLICATIONS

This application is a continuation application of U.S. Non-Provisional Ser. No. 16/642,628, filed Feb. 27, 2020, now issued as U.S. Pat. No. 12,323,651, which is the National Stage Entry under 35 U.S.C. § 371 of Patent Cooperation Treaty Application No. PCT/US2018/047731, filed Aug. 23, 2018, which claims the benefit of U.S. Provisional Patent Application Nos. 62/552,032 filed on Aug. 30, 2017, the contents of which are hereby incorporated by reference herein.

BACKGROUND

A variety of digital video compression technologies enable efficient digital video communication, distribution and consumption. Some examples of standardized video compression technologies are H.261, MPEG-1, MPEG-2, H.263, MPEG-4 part2 and H.264/MPEG-4 part 10 AVC. Advanced video compression technologies, such as High Efficiency Video Coding (HEVC), may provide twice the compression or half the bit rate at the same video quality compared to H.264/AVC.

SUMMARY

Systems, methods, and instrumentalities are disclosed for dynamic picture-in-picture (PIP) by a client. The client may, for example, reside on any device, such as a wired device (e.g., television (TV)) or a wireless transmit/receive unit (WTRU) (e.g., a smart TV, a handheld wireless device, etc.). The device may receive video content from a server, and identify an object within the video content using at least one of object recognition or metadata. The metadata may include information that indicates a location of an object within a frame of the video content. The metadata may be provided in the video content or along with the video content. The device may receive a selection of the object by a user, and determine positional data of the object across frames of the video content using at least one of object recognition or metadata (e.g., track the object across the frames the video content). The device may display an enlarged and time-delayed version of the object within a PIP across the frames of the video content. The location of the PIP within each frame may be fixed (e.g., predetermined and uncoupled to the location of the object within each frame) or may be based on the location of the object within each frame (e.g., "floating" across each video frame based on the location of the object, located within the closest corner to the object, etc.).

In some examples, the device may receive video content from a server, and identify an object within the video content using at least one of object recognition or metadata. The device may receive a selection of the object by a user, and determine positional data of the object across frames of the video content using at least one of object recognition or metadata (e.g., track the object across the frames the video content). The device may display an enlarged version of the object within a picture-in-picture (PIP) across the frames of the video content, where for example, wherein a location of the PIP within the frames is determined based on the positional data of the object within the frames of the video content (e.g., the PIP is "floating" across the frames based on the location of the tracked object). The PIP may be a smaller window within the frames of the video content.

In some examples, the device may receive video content from a server (e.g., a content server). The device may determine a first position of an object within a first frame of the video content based on object recognition or metadata. For example, the device may identify the object (e.g., based on object recognition or metadata), and determine the location of the object with a frame of the video content (e.g., based on object recognition or metadata). The device may determine a position of a first window based on the first position of the object. For example, the position of the first window may be directly correlated with (e.g., overlap or encompass) the position of the object in the first video frame. The first window may include a visually enlarged portion of the first frame, and the visually enlarged portion of the first frame may include the object. The device may display the first window within the first frame on the display device.

The device may determine a second position of the object within a second frame of the video content based on object recognition or metadata, where, for example, the second frame may be temporally subsequent to (e.g., after) the first frame in the video content. The second position of the object may be different than the first position of the object (e.g., the object may appear to have moved across the frames). The device may determine a position of a second window based on the second position of the object. The second window may include a visually enlarged portion of the second video frame, and the visually enlarged portion of the second video frame may include the object. The position of the second window may be different than the position of the first window (e.g., based on the change in position of the object from the first frame to the second frame). The device may display the second window within the second frame on the display device. In some examples, the device may display information relating to the object within the second frame (e.g., overlay information above the object).

The device may track multiple objects, and when tracking multiple objects, may create a merged window for the objects if the objects come in close proximity to one another. For example, the device may determine a position of a second object (e.g., a second soccer player) within a third frame of the video content based on object recognition or metadata, and may determine a position of a window comprising the second object in the third frame based on the position of the second object within the third frame. The device may also determine a third position of the object (e.g., the "first" object) within the third frame based on object recognition or metadata, and determine a position of a window comprising the object in the third frame based on the third position of the object. The device may then determine that the window comprising the object in the third frame overlaps with the window comprising the second object in the third frame. In turn, the device may display, on the display device, a merged window comprising the object and the second object within the third frame. The location of the merged window may be, for example, based on the position of the object and the position of the second object in the third frame (e.g., such that the merged window includes both the object and the second object).

The device may unmerge a merged window if multiple tracked objects move away from one another. For example, the device may determine a position of the object within a fourth frame of the video content based on object recognition or metadata, and determine a position of a window comprising the object in the fourth frame based on the position of the object within the fourth frame. The device may determine a position of the second object within the fourth frame based on object recognition or metadata, and determine a position of a window comprising the second object in the fourth frame based on the position of the second object within the fourth frame. Thereafter, the device may determine that the window comprising the object in the fourth frame no longer overlaps with the window comprising the second object in the fourth frame, and in turn, the device may display, on the display device, the window comprising the object and the window comprising the second object within the fourth frame (e.g., display two separate windows, one with each object).

The device may incorporate a time-delay to the display of a window that includes a tracked object. For example, the device may determine a third position of the object within a third frame of the video content based on object recognition or metadata. Thereafter, the device may display the third window in a predetermined location within a fourth frame on the display device, where the fourth frame is temporally subsequent to the third frame. The predetermine location may be, for example, uncoupled to the location of the object and/or in a fixed location across video frames. In some example, the third window may include a visually enlarged portion of the third video frame, and the visually enlarged portion of the third video frame may include the object.

The device may allow for user selection of objects that are selectable and/or allow for the user to select an object for a PIP (e.g., for enlargement within a PIP). For example, the first window may include the visually enlarged portion of the first video frame based on a user selection of the object. Further, the device may also for a user to cycle through a plurality of objects for selection. For example, the device may identify a plurality of objects within an earlier video frame of the video content, where the plurality of objects comprising the object. The plurality of objects may be selected (e.g., selectable) by the user. The device may displaying a plurality of windows within the earlier video frame, each of the plurality of windows may include a respective object of the plurality of objects, and for example, where each of the plurality of windows may provide an indication of the respective object. The device may cycle through a window of focus of the plurality of windows based on user input. The window of focus may be, for example, a highlighted window that also for a user to identify which object is currently selectable. The device may receive a user selection of the object of the plurality of objects, and enlarge the object within the first window based on the user selection. The device may also allow the user to remove objects from the plurality of objects. For example, the device may receive a user selection of an undesired window of the plurality of windows, and cease displaying of the undesired window (e.g., remove the object from those that the user can cycle through).

Systems, methods, and instrumentalities are disclosed for tracked video zooming. Client-side (on-device) or local tracking may permit users to select arbitrary objects for tracking and zooming. Tracking metadata may be provided (e.g., a video broadcast may contain metadata describing locations of objects in video frames), for example, in addition to or as an alternative to client-side tracking. Metadata may contain enhanced information about tracked objects. A user may interact with an object shown (e.g., in a picture-in-picture (PIP)) to obtain additional information. Video zooming (e.g., in a PIP) may be provided in a fixed location and/or a floating location (e.g., moving with a tracked object). Multiple objects may be simultaneously tracked and zoomed (e.g., in multiple PIPs). A user may cycle through and select among multiple tracked objects (e.g., to switch an object being tracked and zoomed in PIP). PIP zoom may be provided with advanced features, e.g., combining multiple PIP windows, splitting a PIP window, freeze and zoom, time delay zoom, PIP and social media, and repositioning PIP.

BRIEF DESCRIPTION OF THE DRAWINGS

Like reference numerals in the figures indicate like elements.

DETAILED DESCRIPTION

Figure 1:
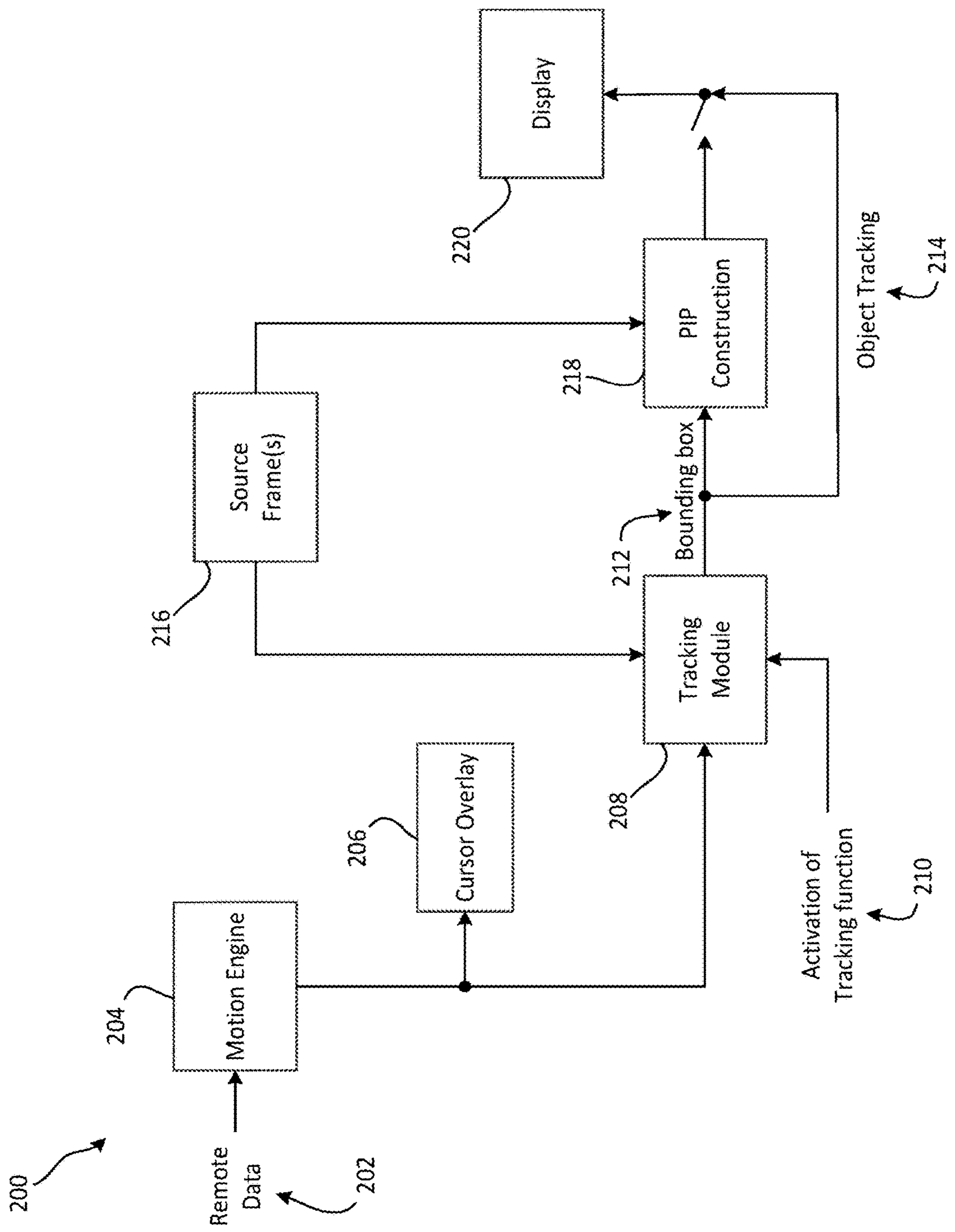
FIG. 1 shows an example system diagram of a television with on-device tracking.

A detailed description of illustrative embodiments will now be described with reference to the various Figures. Although this description provides a detailed example of possible implementations, it should be noted that the details are intended to be exemplary and in no way limit the scope of the application.

Smart TV's may permit interaction with TV content. In an example, a TV may allow a user to navigate a video using a magnifier utility. A user may select Picture-In-Picture (PIP) content manually, for example, by pointing at a region of a screen. Magnification and/or PIP may enhance TV viewer interface. PIP may be used, for example, to monitor a second video source for activity (e.g., user may watch a second TV channel in PIP while watching a first TV channel in a main area of a display). Main and PIP views may be toggled.

Tracking information, which may be supplied externally from a broadcaster, may be used, for example, to create a representation of player positions (e.g., to assist a viewer in navigating a scene). An activity graph may be produced (e.g., using audio and player location data), for example, to assist a viewer in navigating a scene.

Television viewing experiences may be static and non-personalized. PIP may be used to display a second video source in a small window of the main television display. PIP may be assigned to a different channel or video input. A user may select a channel or source shown in a PIP with minimal customization and interaction.

Advanced image analysis techniques may support providing a user with an array of pixels and description of content. A user may, for example, view a close up or zoom in on a particular portion of a video. A magnifier may be provided such that a user may manipulate over a screen to zoom into regions of interest in moving video content. A user may move a magnifier (e.g., using a motion remote or other pointing device), for example, to follow an object of interest.

Object tracking may be used to control presentation of video zooms. Object tracking may include, for example, client-side tracking of objects selected by a user. Object location information may be provided as meta-data with video frames. A pointing device (e.g., a remote) may be used to select among multiple objects of interest. A pointing device may be used, for example, to select (e.g., a single) object of interest (e.g., a single player on a team) and (e.g., as a result) one or more associated (e.g., additional) objects (e.g., multiple players on the same team) may (e.g., additionally) be selected and tracked (e.g., along with the selected object). Multiple usage modes may be provided (e.g., fixed PIP zoom and floating PIP zoom). An object may be selected for tracking and/or processing (e.g., zooming), for example, automatically (e.g., based on one or more selection criteria) and/or by (e.g., a user) cycling through multiple tracked objects.

Selection of content, object tracking (e.g., operating locally on a device or via tracking meta-data received along with the content) and reproduction (e.g., in a PIP), for example, at a fixed location or floating (e.g., following tracking data) may be performed.

FIG. 1 shows an example system diagram 200 of a display device (e.g., a TV) with on-device tracking. Remote data 202 from a remote control may be received by a motion engine 204 of the display device. The remote data 202 may include information relating to a user's selection of an object of a video frame. The user may use the remote control to select an object of interest (e.g., to support tracking). The remote control may be, for example, a "motion remote," which may allow a user to control an on-screen pointer. The motion engine 204 may determine the location of the user's pointer based on the remote data 202. A cursor 206 may be overlaid the video frame on the display device to, for example, indicate to the user an object they can select for PIP.

In some embodiments, the remote control may not be a motion remote, and for example, may include a touchscreen for object selection. In such examples, the remote data 202 may be provided directly to a tracking module (e.g., CamShift) 208 of the display device.

The tracking module 208 may receive object position information, for example, upon activation of a tracking function 210 (e.g., by pressing a button on the remote control). The tracking module 208 may also receive a source video frame 216 (e.g., that includes the object). The position of the object may be tracked across video frames 216 over time. A bounding box (e.g., an indication of the object, such as a small box) may be determined and displayed around the object in a video frame (e.g., in each source video frame 216).

The object position information may be provided, for example, to a PIP construction module 218. The PIP construction module 218 may also include the source video frames 216. If activated, the PIP construction module 208 may generate a window (e.g., a PIP window) around some portion of the video frame that includes the object. In some examples, the PIP construction module 208 may visually enlarge the portion of the video frame that includes the object within the PIP window (e.g., a zoom operation may be performed). Visual enlargement (e.g., zooming) may be performed, for example, using an image scaling procedure, such as interpolation (e.g., bilinear or bicubic) or resampling (e.g., Lanczos). The PIP construction module 218 may overlay the PIP window onto the source video frame 216. The resulting frame may be referred to as a composite frame (e.g., the source video frame plus a PIP window). The PIP construction module 218 may provide the composite frame to the display 220 for presentation to the user.

A PIP window may have an expanded size, for example, compared to a bounding box for an object on which a zoom is based. In an example, a bounding box for an object may be determined to be 200×225 pixels. An example zoom factor may be 2×. A PIP window displaying a zoomed object may be, for example, 400×450 pixels. A PIP window may be displayed, for example, in a fixed location of a display (e.g., in a corner of the display) or a mobile/moving location (e.g., a floating PIP), such as moving along with a tracked object. Further, in some example, the PIP window may move between the corners of the display (e.g., based on the location of the object, based on display information from the underlying source video frames, etc.). A PIP window including the zoomed object may be displayed, for example, based on a position (e.g., center position) of an object as the object and its associated position (e.g., center position) may change over time. A floating PIP window may, for example, occlude or block an object on which it may be based, e.g., along with area surrounding the object.

Client-side (on-device) tracking may allow users to select objects (e.g., arbitrary objects) for tracking, which may improve user experience (e.g., by letting users select their own objects of interest). The device may visual enlarge one or more objects based on user selection. Client-side tracking may avoid a need to receive object position information as part of a TV broadcast (e.g., because tracking may be performed by the client based on object recognition). Client-side tracking may allow an interactive zoom system to work with any received content. Computational requirements on a device may be managed, for example, by implementing algorithms that may utilize modest resources and may be performed in real-time. One or more video object tracking algorithms may be used to follow locations of objects across video frames over time, such as, for example, "CAMshift" and "mean shift", although other algorithms may be utilized.

Figure 2A:
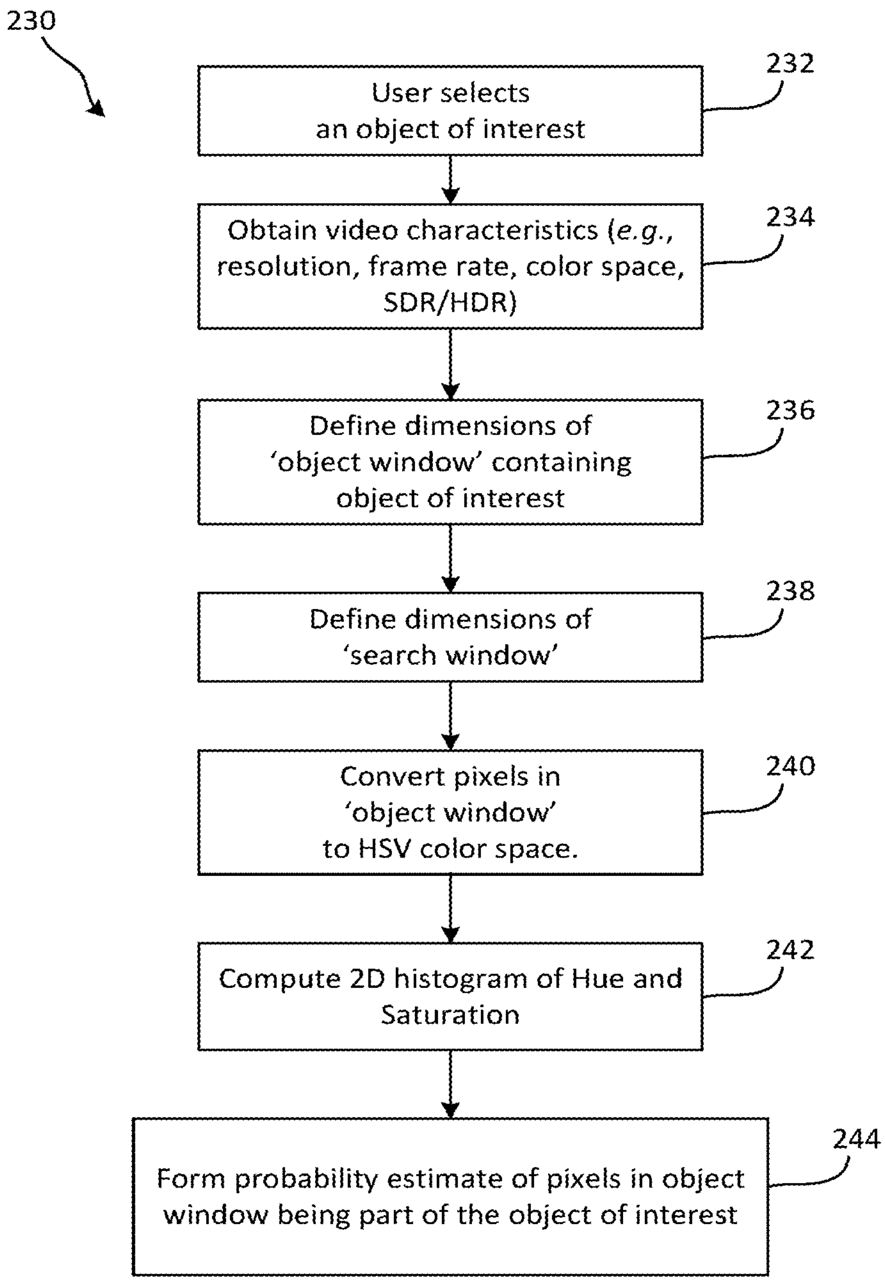
FIG. 2A and FIG. 2B provide examples of client-side object tracking.
Figure 3:
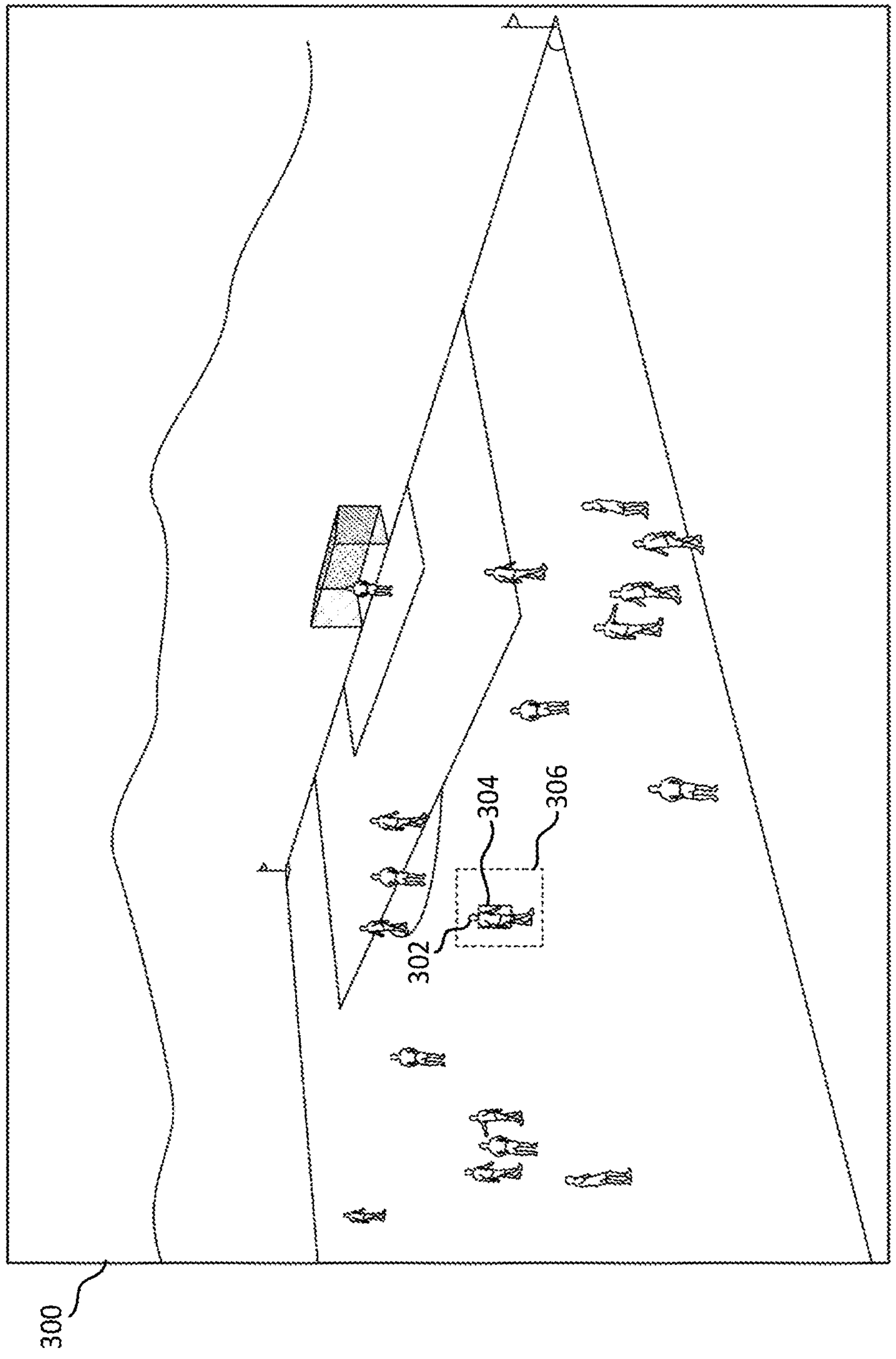
FIG. 3 shows an example of an initial object window position (e.g., red box) and a search window position (e.g., yellow box).

The flow of object tracking may be in multiple (e.g., two) stages, such as an initialization stage and a tracking stage. FIG. 2A shows an example of a client-side object tracking initialization procedure 230. FIG. 3 shows an example video frame 300 that includes an object 302, an object window position 304, and a search window position 306.

The device may determine one or objects to track. For example, the device may determine the object(s) to track based on a user selection at 232. A user may select one or more objects (e.g., an arbitrary object). In an example, a user may use a remote control or other pointing device to move, draw or otherwise locate a cursor or box around a screen and indicate (e.g., by pressing a button) a desire to track a selected object. The device may perform object tracking based on an object's starting position. At 234, the device may receive video characteristics (e.g., resolution, frame rate, color space, SDR/HDR) of the video frame.

At 236, the device may define an object window (e.g., the object window 304) that includes the object of interest (e.g., the object 302). The device may determine the size of the object window, for example, based on the characteristics of the video (e.g., resolution, frame rate, color space, SDR/HDR). At 238, the device may determine a search window (e.g., the search window 306). The search window may be used when tracking the object between frames. The device may determine the size of the search window using the characteristics of the video frames.

Figure 4A:
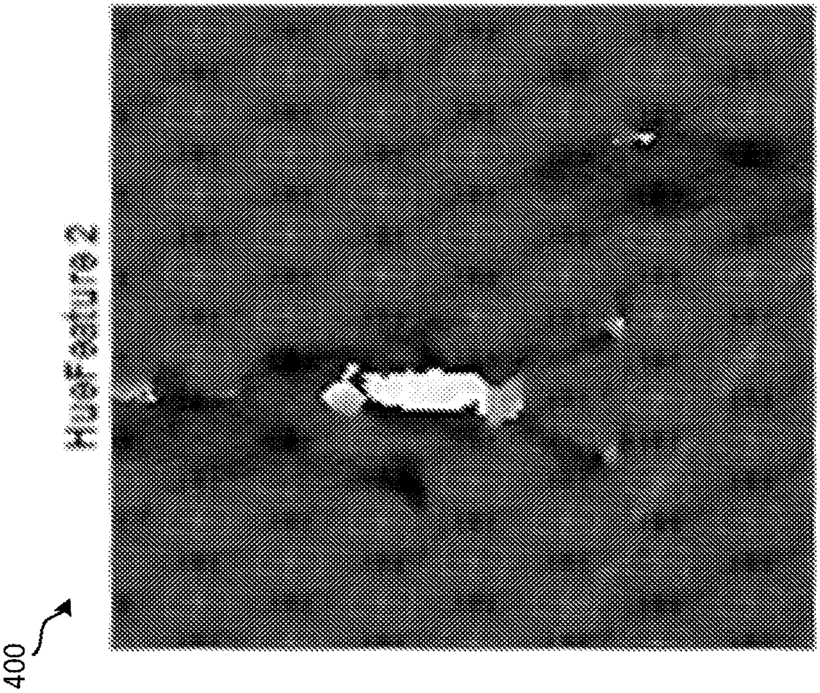
FIG. 4A and FIG. 4B provide examples of saturation (FIG. 4A) and hue (FIG. 4B) features in a search block of a video frame.
Figure 4B:
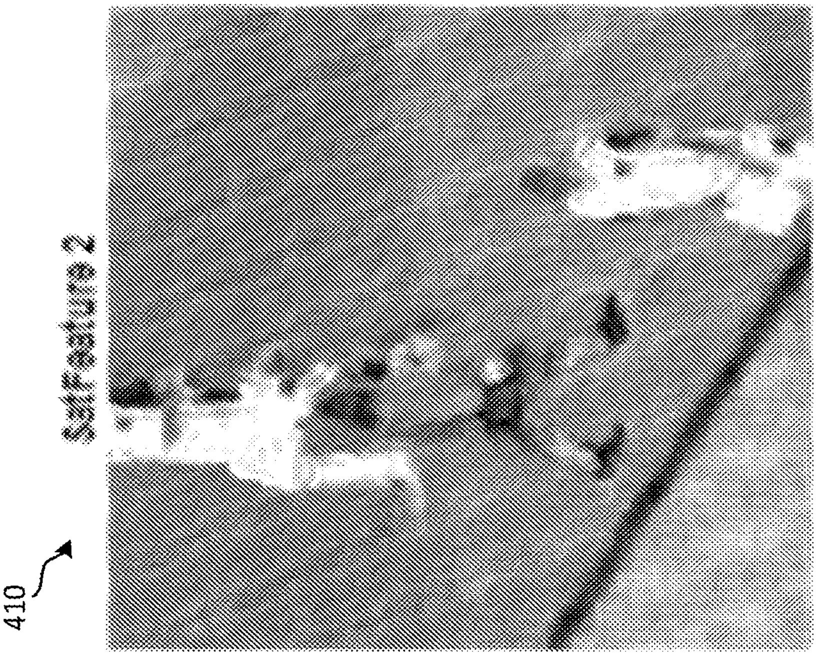
Figure 5:
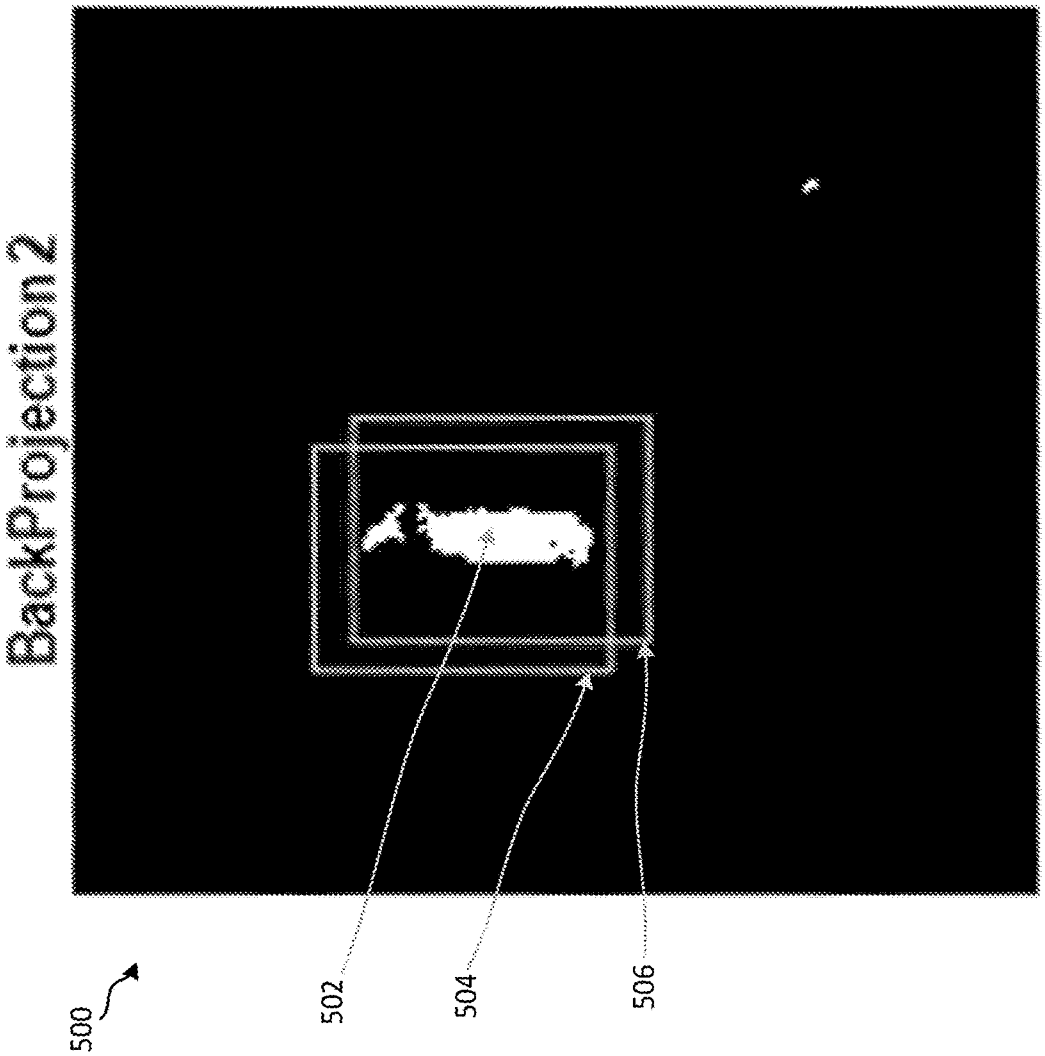
FIG. 5 shows an example of a back projection probability and target window.

The device may determine (e.g., construct) a probability map, for example, to determine the likelihood of a pixel within the object window being part of the object. The device may use various features to construct the probability map. For example, the device may use a color histogram to construct the probability map. The device may analyze the object window including the object to form a probability estimate. At 240, the device may convert the pixels in the object window, for example, to the HSV color space. At 242, the device may compute a two-dimensional (2D) histogram of Hue and Saturation values (e.g., as shown by example in FIG. 4A-B) of the pixels within the object window. FIG. 4A shows an example of hue features 400 in a search block of a video frame, while FIG. 4B shows an example of saturation features 410 in the search block of the video frame). At 244, the device may use a 2D histogram, for example, to form a probability estimate of a pixel being part of the object being tracked. FIG. 5 shows an example of a back projection probability and target window 500. FIG. 5 shows an example of an image 502 representing a probability per pixel along with rectangles 504, 506 illustrating movement of a detected region under "mean shift" iterations.

Figure 2B:
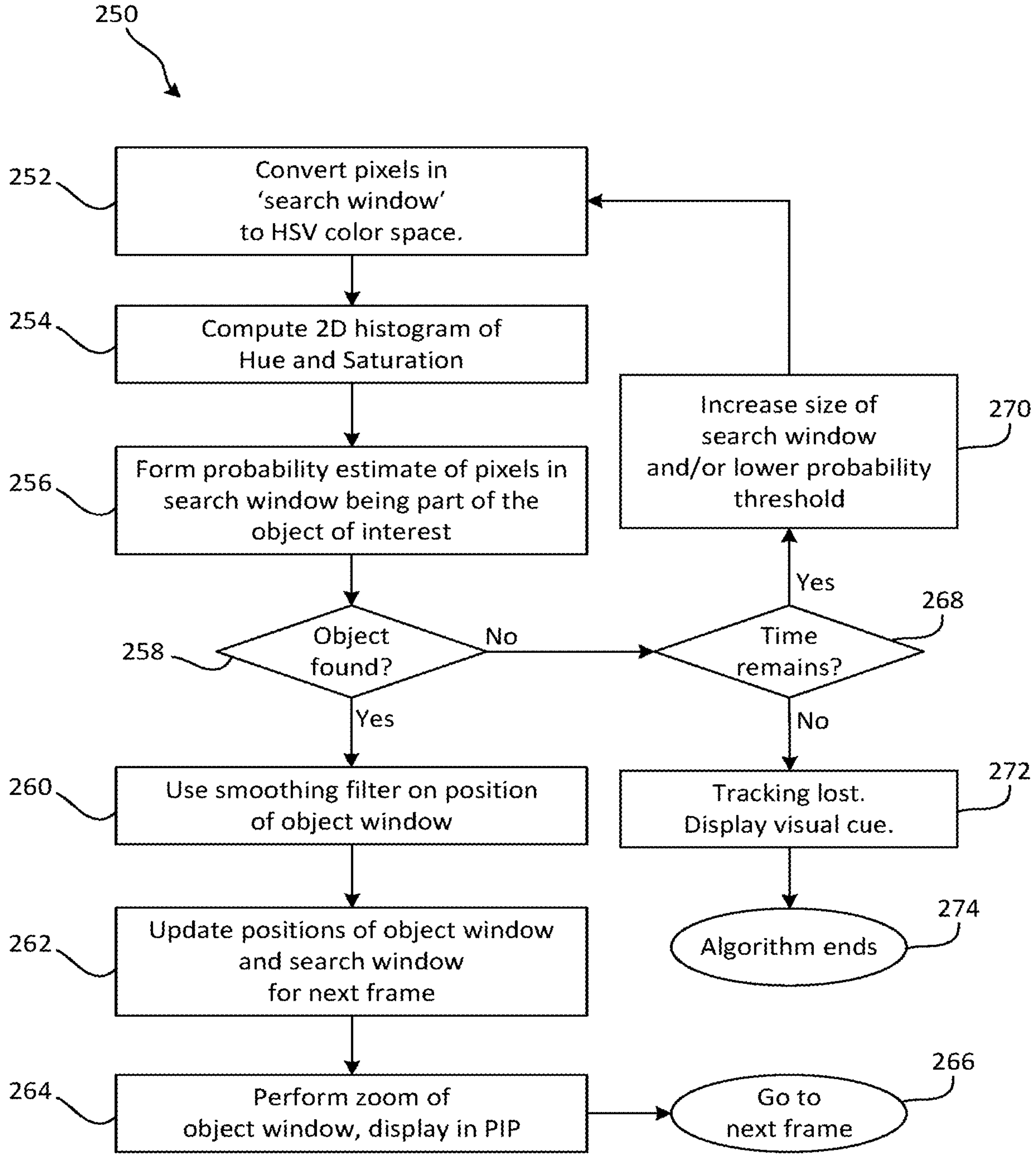
Figure 6:
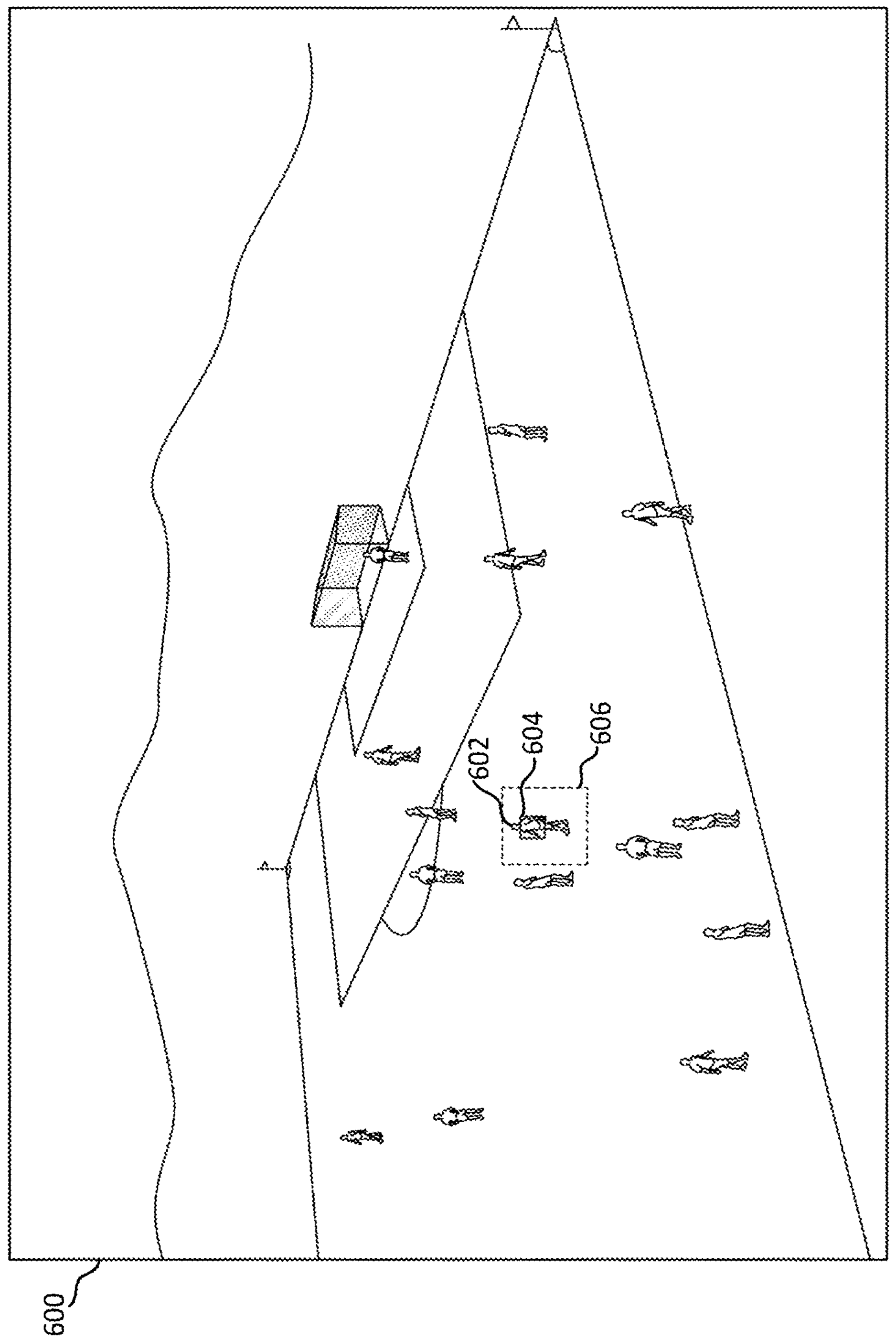
FIG. 6 shows an example of a new object window position (e.g., red box) and search window position (e.g., yellow box).

FIG. 2B shows an example of a client-side object tracking procedure 250. FIG. 6 shows an example video frame 600 that includes the object 602 with an object window 604 and a search window 606. The video frame 600 may occur at a temporally subsequent time after the video frame 300 (e.g., may come after the video frame 300). The object 602 of the video frame 600 may be the same object as the object 302 of the video frame 300.

The object tracking procedure 250 may be performed (e.g., in subsequent video frames), for example, until a user stops tracking the object (e.g., the object 602) or tracking of the object is lost. At 252, the device may convert pixels in a search window (e.g. the search window 606) to the HSV color space. At 254, the device may compute a 2D histogram of Hue and Saturation values of the pixels within the search window. At 256, the device may form a probability estimate of the pixels within the search window being a pixel of the object of interest. For instance, the device may perform a search within the search window for the object of interest, for example, by constructing a probability map for the pixels within the search window. For example, the device may use the probability of each pixel within the search window to determine whether a pixel belongs to the object being tracked.

If the device does not find the object at 258, then the device may determine whether time remains on a search timer at 268. If time does remain on the search timer, then the device may increase the size of the search window and/or lower the probability threshold at 270, and continue searching the search window for the object. For example, the device may enlarge the search window and/or decrease the probability threshold (e.g., with sufficient time remaining before a decoded frame may be rendered on a screen), for example, when the object is not found in the search window at 258. If the search timer expires at 268, then the device may provide some visual cue that the tracking of the object has been lost at 272, and end at 274. For example, the device may display a visual clue or indication to indicate that the tracking of the object was lost, and the user may select a new object (e.g., re-select the same object) for tracking, as desired.

The device may determine a new position of the object within a video frame (e.g., as compared to the location of the object in earlier video frames) when the object is found within the search window. For example, if the device finds the object within the search window at 258, then the device may use a smoothing filter on the position of the object window at 260. For example, the device may use a filter to smooth out the tracked position of the object over time, for example, to minimize fluctuation and improve user experience (e.g., an object position may vary widely). The device may use any type of smoothing filters (e.g., low-pass filter, median filter) and a varying number of past object positions, for example, depending on the type of content (e.g., movies, sports, etc.).

The device may update the positions of the object window and the search window based on the position of the object at 262. For example, the device may apply the filter, for example, by keeping track of N past positions for an object being tracked, where N is a number of previous video frames where the object was identified. The filter may use the object's position from one or more past video frames and/or the current video frame to obtain an updated object position for the current video frame, for example, in accordance with the following formula or logic:

$$\text{Updated position for current video frame} = \text{filter(current position, } N \text{ past positions)}$$

In an example, a median filter may be applied to current position (t0) with N=4 past positions (t1, t2, t3, t4), which may result in, for example:

Updated position for current frame =

$$\text{median}\,\{pos(t0),\ pos(t1),\ pos(t2),\ pos(t3),\ pos(t4)\}$$

The device may update the position of the object window (e.g., frame by frame), for example, to follow the object as it moves around across video frames. The device may update the position of the search window (e.g., frame by frame), which may be centered around the object window. The device may visually enlarge (e.g., zoom) the portion of the video frame that is included in the object window at 264. The device may display the resulting video frame with a PIP window that includes the portion of the video frame that includes the object at 266. For example, the device may display the PIP window as a fixed window (e.g., as shown by example in FIG. 7) or as a floating window (e.g., a window who's location is based on the location of the object—e.g., the window moves around the display screen from frame to frame as the object moves across frames).

Figure 7:
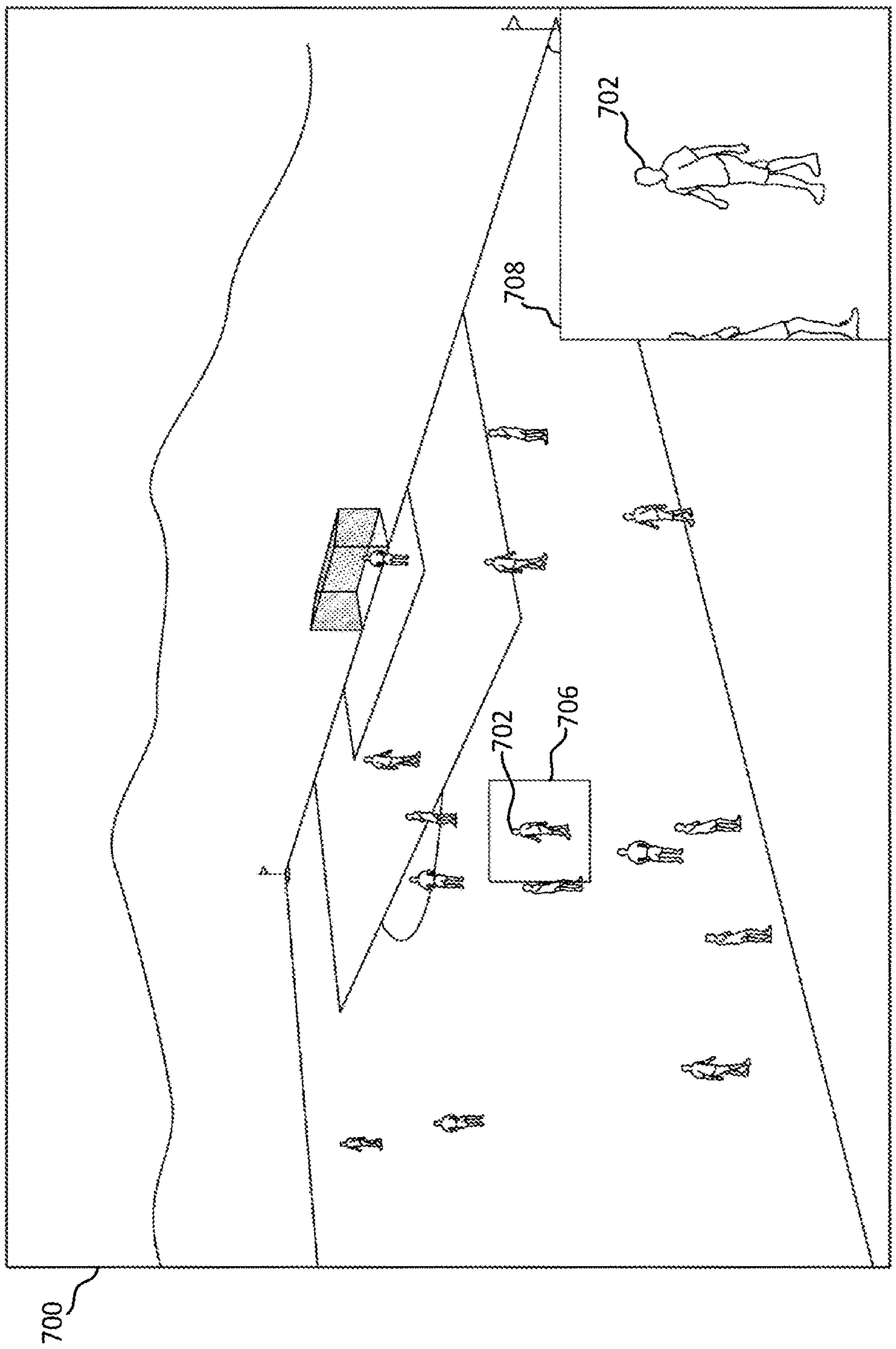
FIG. 7 shows an example of a tracked object zoomed in a PIP window (e.g., in lower right box).

FIG. 7 shows an example of a video frame 700 that includes a tracked object 702 zoomed in a PIP window 708. The video frame 700 may be the same video frame as video frame 600 of FIG. 6, but with the inclusion of an overlaid PIP window 708. Accordingly, the object 702 may be the same as the object 602. The visually enlarged portion of the video frame that is included in the PIP window 708 may be the same visually enlarged portion of the video frame that is inside the search window 706. The zoom level for the PIP window 708 may be selected (e.g., automatically selected), for example, based on characteristics of the video frame, as chosen by a user (e.g., from a set of available zoom levels), and/or the like.

The device may use the pixels that are determined (e.g., by user selection) to generate color histograms and provide a basis for a search in one or more subsequent frames. The device may determine a color histogram based on a subset of the pixels, for example, based on the object and background segmentation or color difference threshold. The object may move around a scene as time passes, lighting may change, and/or the object may turn revealing new information that was not visible in a prior video frame. An earlier (e.g., initial) color histogram may therefore no longer yield good results in identifying the object in a search window. As such, the device may update the color histogram that is used to compute a probability estimate of a pixel being part of the tracked object (e.g., update the color histogram based on information in subsequent video frames).

The device may tracking one or more objects across video frames. The device may track the object locally (e.g., when the object is identified using a remote pointing device). In an example, the device may leverage the selection of an object to initialize tracking of multiple objects (e.g., players on the same team) that may be present in a video frame. For instance, an object may be selected for tracking (e.g., via pointing). The device may compute a probability map for determining pixels that may be part of the object, for example, via back projection. Back projection may be used, for example, in a small neighborhood around a previous position of a tracked object, for example, to search for a new position. A probability map may be applied to the video frame, which may highlight similar objects (e.g., players on the same team).

Figure 8:
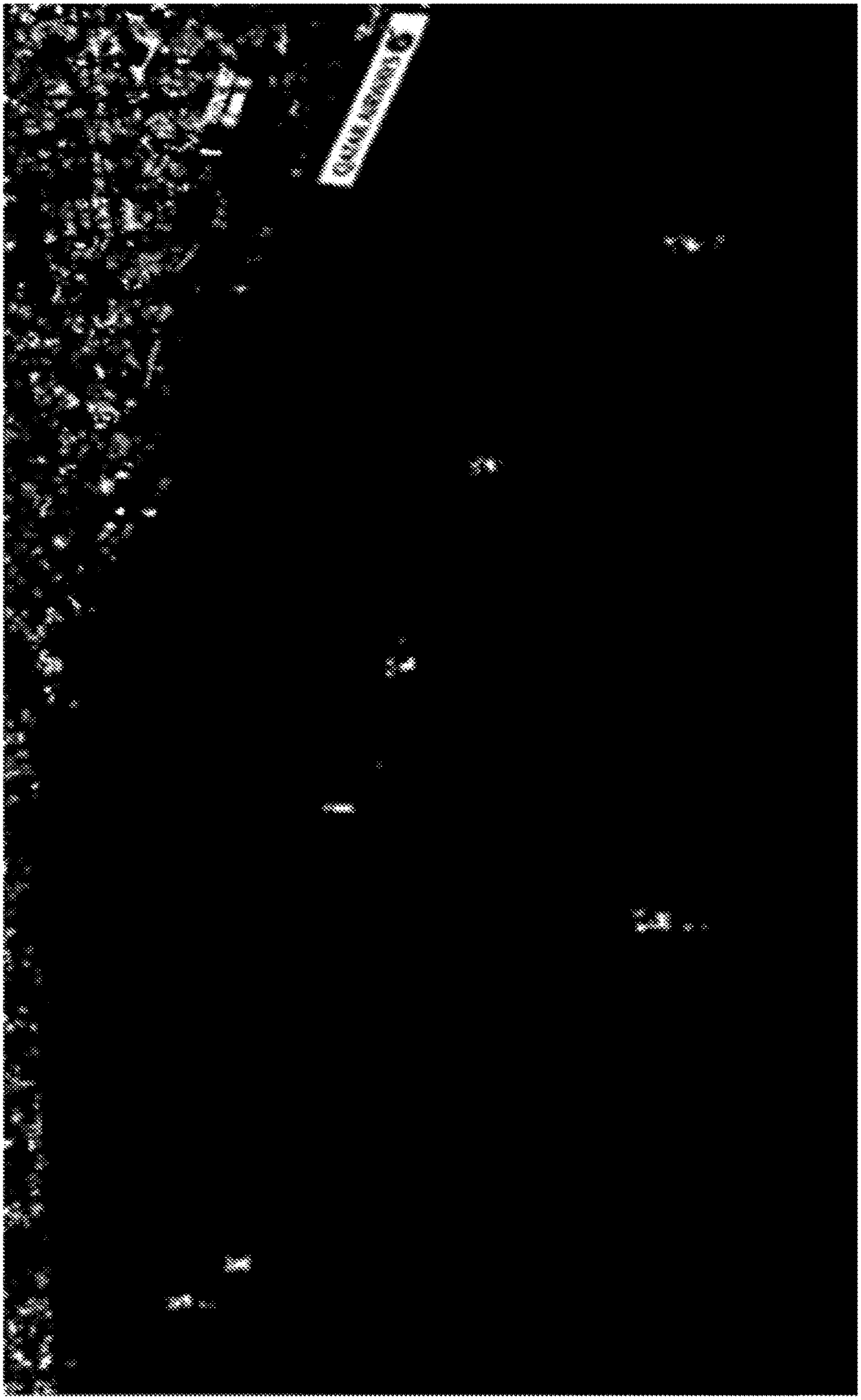
FIG. 8 shows an example of an object probability applied to a frame.

FIG. 8 shows an example of an object probability applied to a video frame 800. FIG. 8 shows an example of selecting a (e.g., single) object and application of a probability map to an (e.g., entire) frame. Individual bright (e.g., white) spots may be players on the same team. As illustrated, there may be a large response from similar colors located off field (e.g., fans in team colors). The device may reject (e.g., ignore) the additional elements located off the field (e.g., the white elements off field), for example, by identifying a boundary of the field (e.g., via hue), to focus on bright spots within the field.

Figure 9:
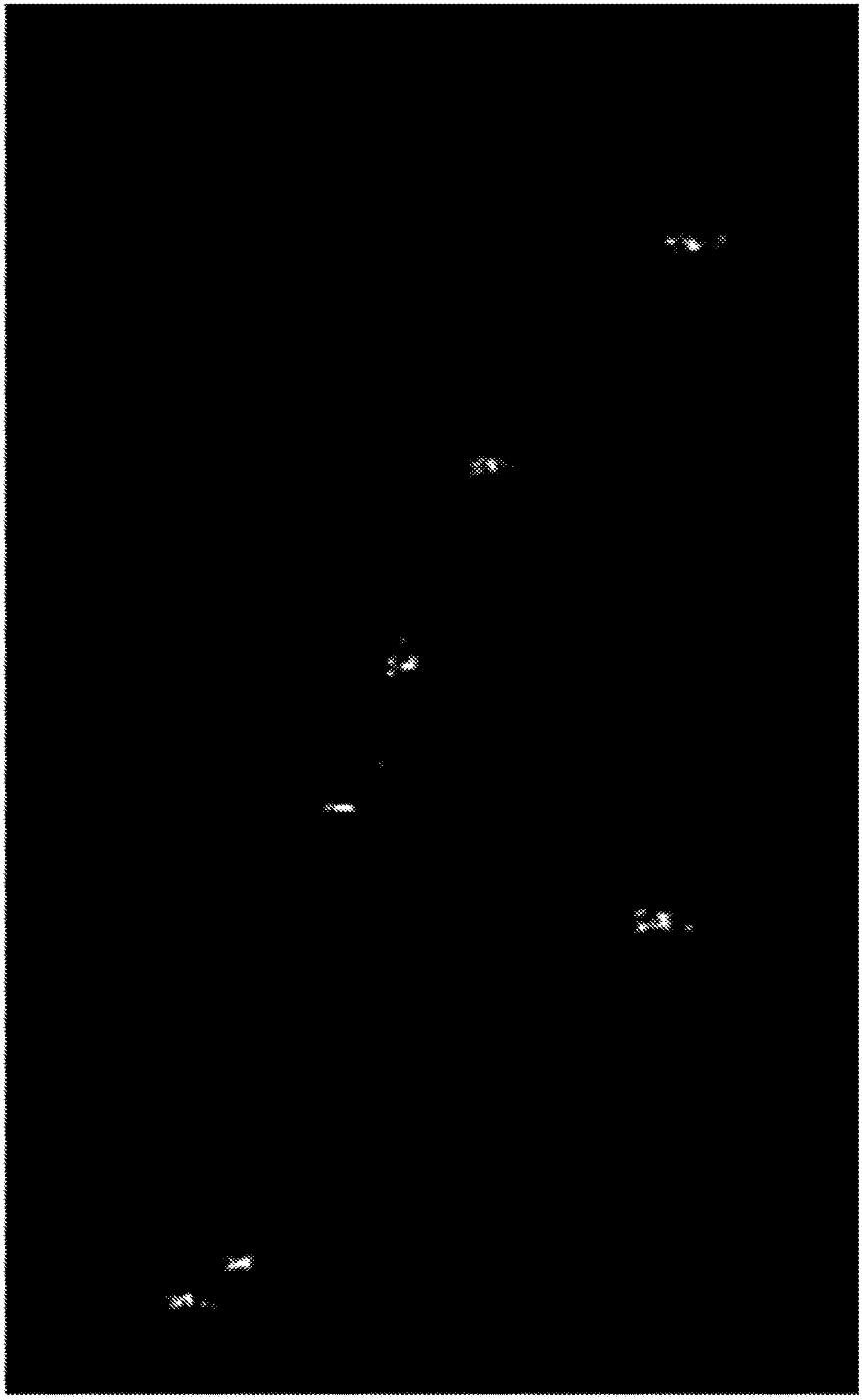
FIG. 9 shows an example of a probability map cleaned by removing off field responses.

FIG. 9 shows an example of a probability map 900 cleaned by removing off field responses of the video frame 800 (e.g., by removing the bright spots that are created by fans, marketing banners, and other objects that are not located on the field of play). The device may unify the regions of the field, for example, via morphological image processing applications of opening and closing.

Figure 10:
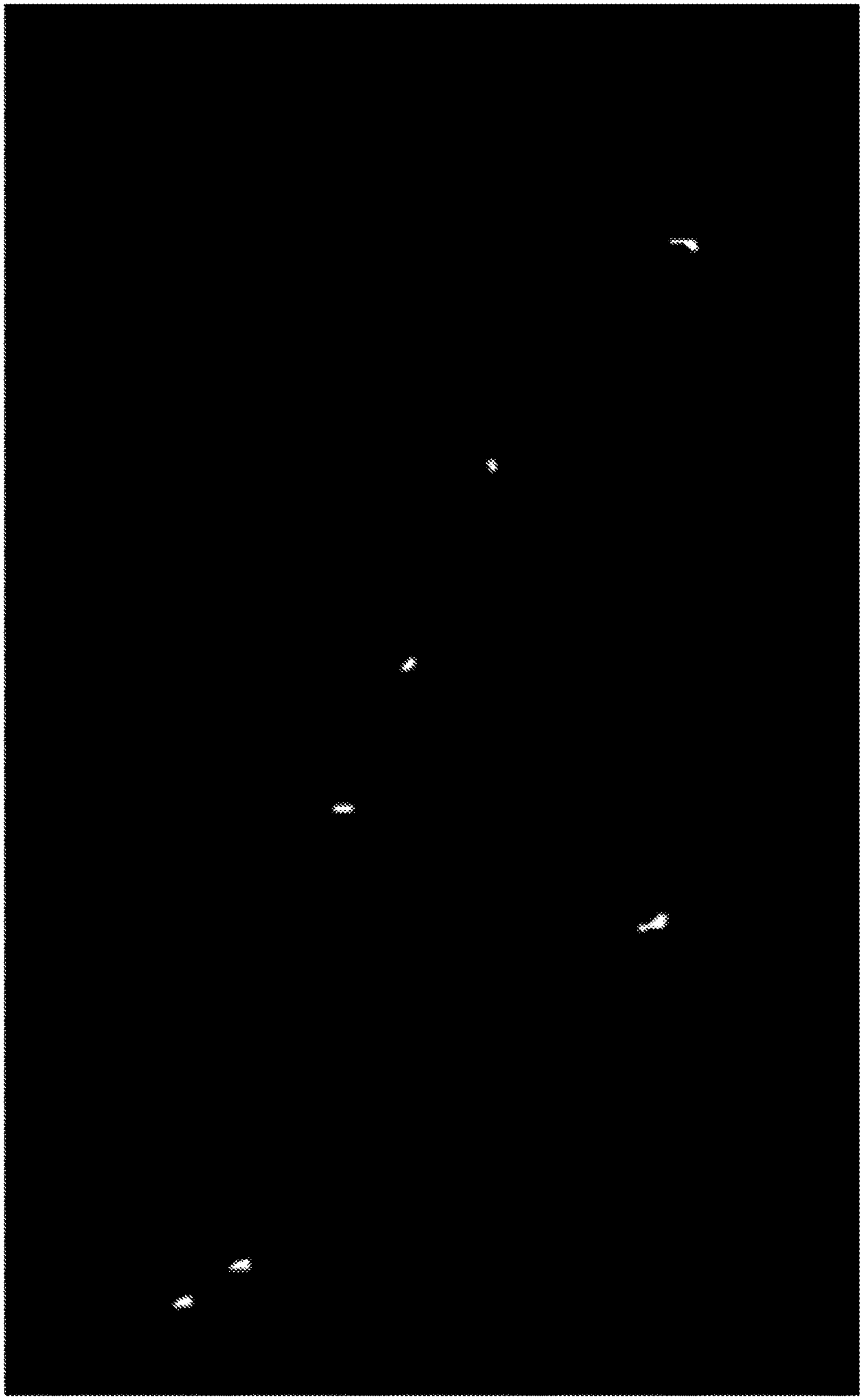
FIG. 10 shows an example result of opening and closing morphological operations.

FIG. 10 shows an example result 1000 of opening and closing morphological operations using the probability map 900 of FIG. 9. As illustrated in the result 1000, the device may identify seven bright spots corresponding to seven players of a selected team (e.g., seven objects). The device may use the locations of the seven bright spots, for example, to initialize the tracking of each corresponding player. The device may reuse the histogram corresponding to a selected object for multiple (e.g., all) objects, which for example, may allow the device to avoid recreating individual object histograms for each of the multiple objects. The device may identify multiple objects (e.g., players with the same uniform on the same team) and track the objects (e.g., as described above), for example, based on a single initializer selection (e.g., selection of a single player).

The device may receive tracking metadata, for example, within the video stream or along with the video stream The device may use the metadata to identify and/or track one or more objects (e.g., identify and/or track the locations of one or more objects), for example, in addition to or in alternative to client-side tracking. For instance, a video broadcast may include metadata describing the location of objects in each video frame, for example, in addition to or as an alternative to performing local tracking of objects on the client side. In an example, supplemental enhancement information (SEI) messages (e.g., Pan-scan rectangle SEI message) in H.264 and H.265 video coding standards may be used to describe a bounding box. A message may describe a range of pixels in a bounding box that may correspond to an object identifier. A video server may use more advanced object tracking, for example, when object tracking resources may be limited in a client-side device. Multiple objects may be tracked (e.g., in real-time or offline by a video server) and their position information may be broadcast, which may allow a display device to allow users to select from multiple objects and switch tracking focus through a list of tracked objects.

Other techniques may be used to improve object tracking. For example, each video object (e.g., each sports team player) may have a radio-frequency identification (RFID) chip permitting precise tracking (e.g., during a football game). Information from the RFID chips may be converted to tracked object positions within a video stream. The device may receive the tracking information via a broadcast of the video stream, and may use the locations information from the RFID chips to track objects (e.g., players) across video frames.

A device (e.g., client) may extract information from a video bitstream (e.g., extract SEI messages), for example, when receiving object tracking information from a server in the video stream. Tracking information may include, for example, a location of an object within a video frame, a size of an "object box" and/or other (e.g., additional or alternative) metadata that may be relevant (e.g., an object identifier, a name or position of a player, a name of a team a player belongs to, etc.). The device may overlay boxes on a subset of objects on screen, for example, as shown in FIG. 11.

Figure 11:
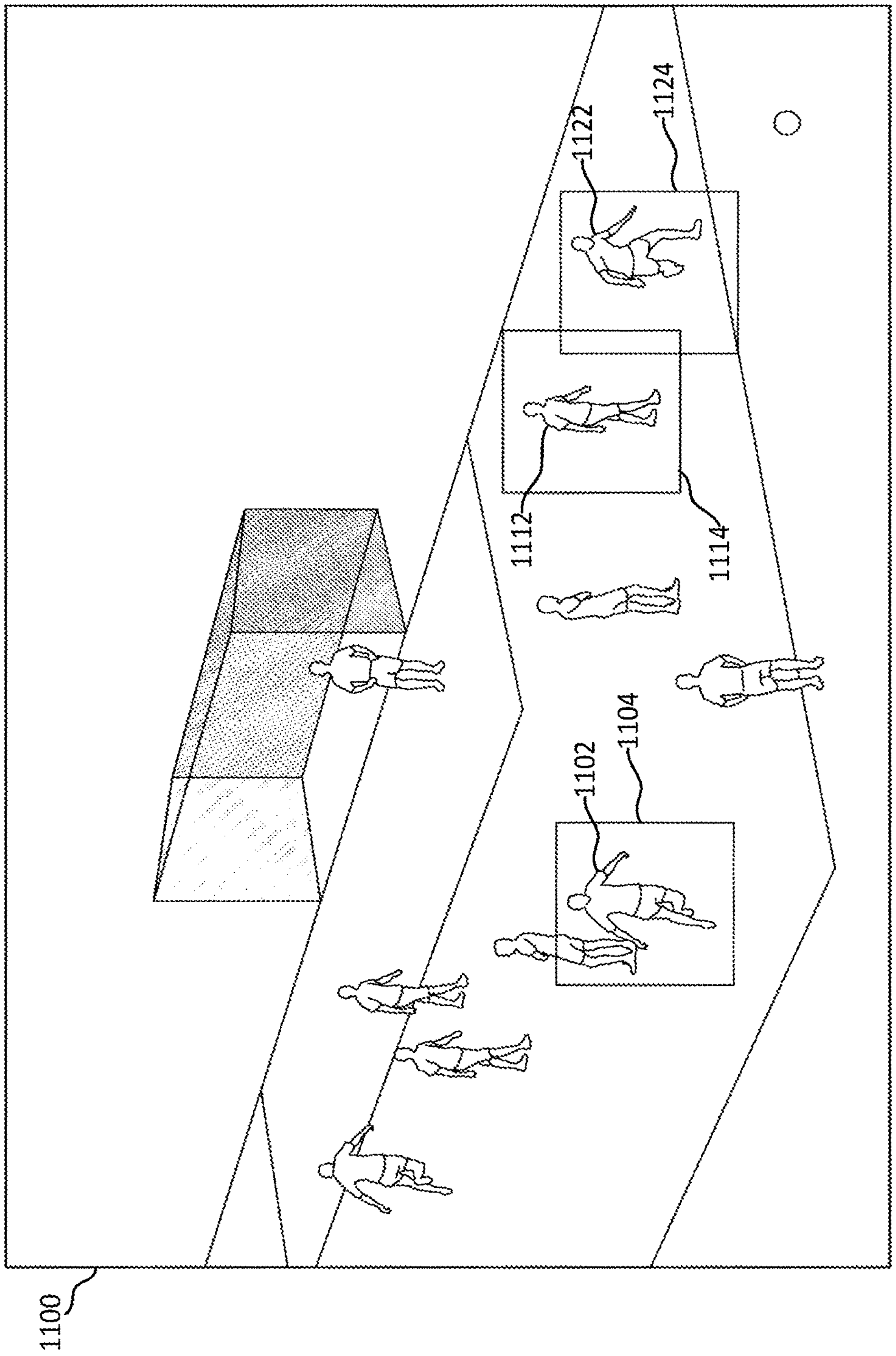
FIG. 11 shows an example of tracking multiple objects using information obtained from metadata.

FIG. 11 shows an example of tracking multiple objects using information obtained from metadata. For example, the device may track object 1102, and may display the tracked object 1102 within a window 1104 that includes a portion of the video frame and the tracked object 1102. The device may track object 1112, and may display the tracked object 1112 within a window 1114 that includes a portion of the video frame and the tracked object 1112. Further, the device may track object 1122, and may display the tracked object 1122 within a window 1124 that includes a portion of the video frame and the tracked object 1122. The objects 1102, 1112, 1122 may be selected by a client (e.g., based on one or more criteria that may be fixed or selectable, such as players on a team, most important players on a team, etc.). The objects 1102, 1112, 1122 may be chosen by the user based on preferences (e.g., user definitions) or by selecting from a menu of choices. A user may select the objects 1102, 1112, 1122 for tracking. The device may track the objects 1102, 1112, 1122 across video frames, and may display a window that includes the tracked object in each respective frame.

Figure 12:
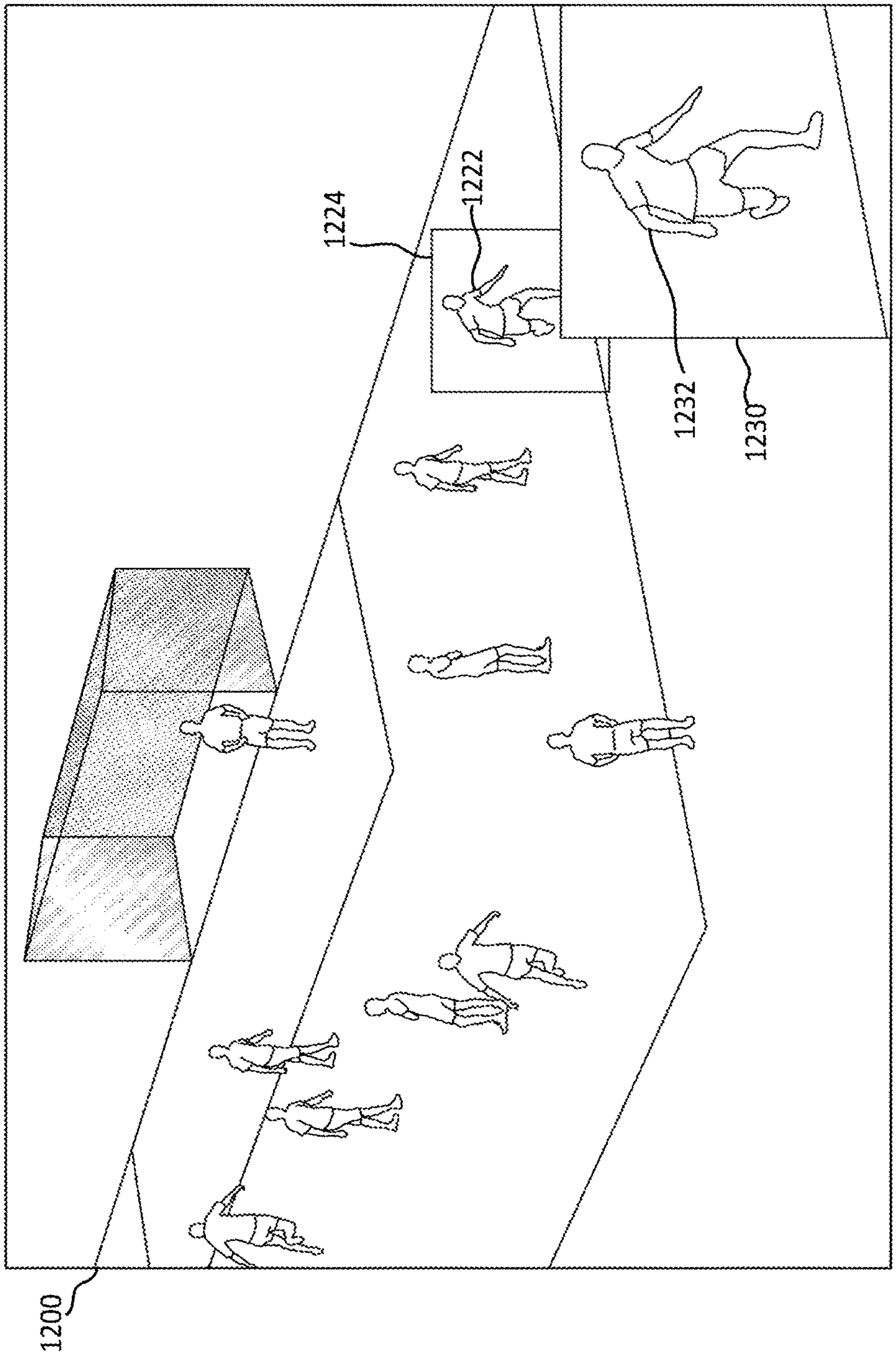
FIG. 12 shows an example of a selected object zoomed in PIP in a fixed location (e.g., bottom right).

The device may visually enlarge the object (e.g., zoom) and may display the visually enlarged object within a PIP window on the display, for example, as shown in FIG. 12. FIG. 12 shows an example of a video frame 1200 that includes a window 1224 around the object 1222 and a PIP window 1230 that depicts a visually enlarged copy of the object 1232 from the video frame 1200. Although illustrated as a fixed PIP window 1230 (e.g., the PIP window 1230 is in a fixed location, e.g., bottom right), it should be appreciated that the device may display a floating PIP that overlays the object 1222. It should be appreciated that the video frame 1200 may be the same as the video frame 1100, but with the inclusion of the PIP window 1230 and the removal of the windows 1104, 1114. Further, although the PIP window 1230 illustrates a visually enlarged version of the object 1232, in some example, the PIP window 1230 may be sized and configured such that the object 1222 is not visually enlarged within the PIP window 1230.

The device may allow for a user to interact with the object (e.g., the object located within a PIP window). The device may receive metadata that includes enhanced information about tracked objects. In an example, metadata may include, for example, the name of an actress in a movie or real-time statistics of a player in a NFL game. The device may allow for the user to interact with the object in PIP to obtain additional information about an object. In an example, metadata may include an object identifier that may be used by the device to request information from a database (e.g., local or remote database) or from a website. The device may, for example, fetch from metadata an object identifier that may correspond to an object shown in a PIP. The device may request available information from a database or website and may present information on the display screen (e.g., in a main or PIP window, in a menu therein, etc.). The device may display information in a fixed location of a screen or in a floating overlay that may follow a position of the corresponding tracked object. The device may present information to a user/viewer automatically, for example, similar to a news crawl shown at a perimeter (e.g., bottom) of a screen. Presenting information about an object of user/viewer interest in a PIP may present information relevant to a user/viewer, as compared to presenting generic information that may be irrelevant or not presenting any information. This feature may engage a user and create a sense of personalization.

In an example, the device may be used in a system that displays the PIP on a second screen (e.g., a second TV screen, a smartphone, a tablet, etc.), which may avoid obstructing a portion of space on a TV screen. The second screen may permit enhanced interaction with a user (e.g., shopping for an outfit worn by an actress in a movie), which may provide a form of direct or indirect advertising and revenue for broadcast information.

The device may display the PIP in a fixed location or the PIP may float around the screen with the object (e.g., based on the location of the object). The device may receive object tracking information (e.g., based on object recognition or metadata), and the device may generate the PIP window using the object tracking information. In some example, the PIP window may be held at a fixed location (e.g., bottom right of screen), regardless of the location of the object. The device may map tracked content into a fixed PIP location, for example, as shown by the PIP window 1230 in FIG. 12. The PIP content may follow the tracked object 1222, for example, using locally tracked object position information and/or tracking metadata that may be received with video content. The portion of the video frame within the PIP window 1230 may be magnified (e.g., by various factors that may be chosen by a viewer), for example, as shown in FIG. 12. Further, in some example, the PIP window 1230 may be sized and configured such that the object 1222 is not visually enlarged within the PIP window 1230.

The device may display a floating PIP window, where for example, the location of the floating PIP window is based on the location of the tracked object. The device may receive object tracking information (e.g., based on local object recognition or received metadata), and the device may determine a location for the PIP window using the object tracking information (e.g., based on local object recognition or received metadata).

Figure 13:
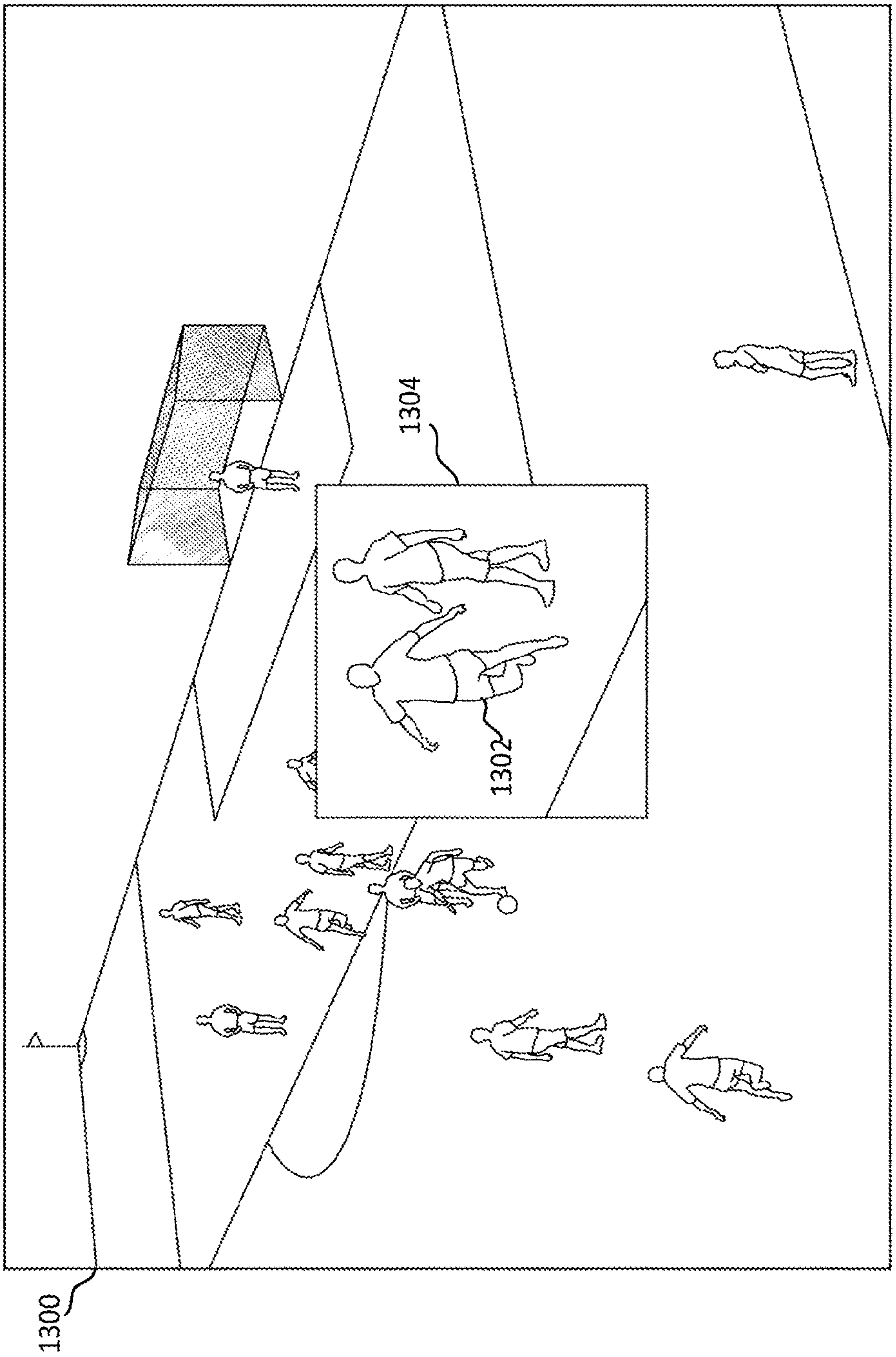
FIG. 13 shows an example of a selected object zoomed in PIP in a floating window (e.g., over a selected object).

FIG. 13 shows an example of a video frame 1300 that include a floating PIP window 1304 that includes a tracked object 1302. The device may display the floating PIP window 1304 over top of the tracked object 1302. The device may determine the location of the tracked object 1302 (e.g., based on local object recognition or received metadata), and based on the location of the tracked object 1302, determine the location of the floating PIP window 1304. Accordingly, in some example, the position of the PIP window 1304 may follow the object 1302 as the object 1302 moves around the display screen across video frames. For instance, the device may display the PIP window 1304 directly over top of the object 1302 (e.g., over the center of the object 1302), thereby concealing the original tracked object 1302, or alternatively, the device may display the PIP window 1304 is a location (e.g., one of the four corners of the display screen) based on the location of the tracked object 1302 (e.g., in the corner that is closest to the tracked object 1302). Further, as illustrated, the portion of the video frame within the PIP window 1304 may be visually enlarged (e.g., including the object 1302 itself). However, in some example, the PIP window 1304 may be sized and configured such that the object 1302 is not visually enlarged within the PIP window 1304.

Figure 14:
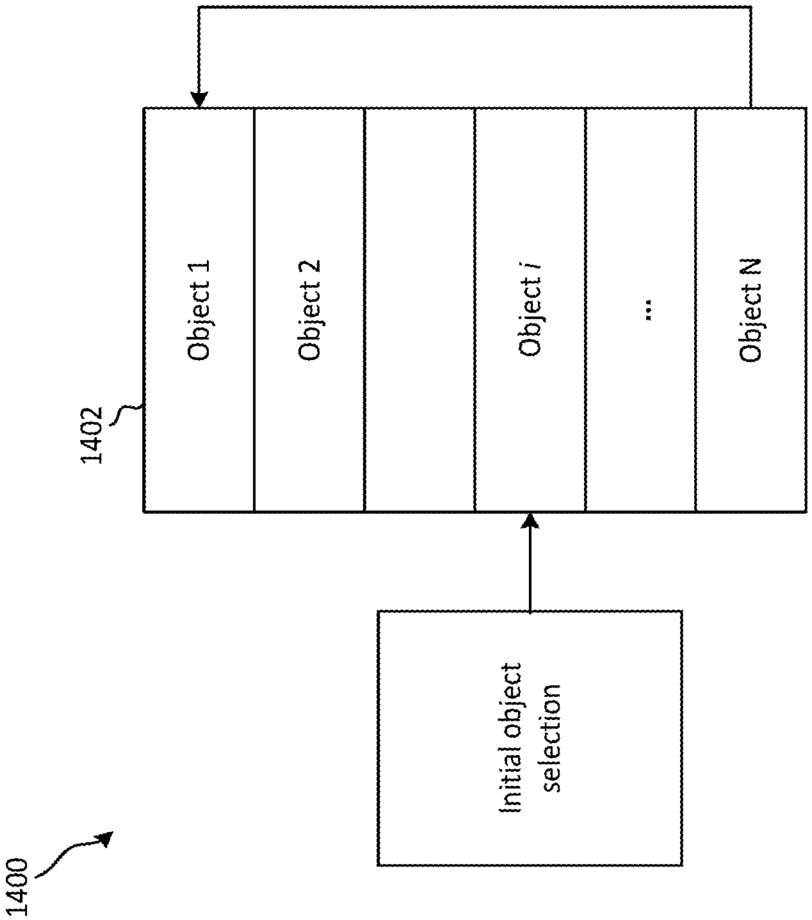
FIG. 14 shows an example of cycling through multiple tracked objects.

The device may allow for a user to cycle through multiple tracked objects, for example, to select one or more tracked objects (e.g., to switch an object being tracked and/or zoomed in a PIP window, to remove objects from a list of actively tracked objects, etc.). FIG. 14 shows an example process 1400 performed by a device for allowing a user to cycle through multiple tracked objects 1-N. Objects may be ordered in a list, for example, by a server (e.g., metadata may include information about how tracked objects may be ordered in a list) and/or by a client or user. The device may (e.g., after receiving tracking information in metadata) order tracked objects based on user preference (e.g., in alphabetical order, by teams, user selection and/or ordering of a subset of available objects, etc.). Alternatively or additionally, the device may use one or more procedures to create a list of tracked objects (e.g., based on object ID). In an example where N objects may be tracked across video frames, the device may allow for a user to select an object (e.g., object i) for zooming in PIP. A user may select an object, for example, by selecting one or more objects from a moving video or a paused video frame (e.g., with playback resuming upon selection of one or more objects).

Once a list is created and the user is prepared to cycle through the object for selection for a PIP window, the device may generate a window of focus. The device may display the object within the window of focus to indicate to the user the current object for selection. The window of focus may, for example, look similar to a PIP window (e.g., but without the visual enlargement the portion of the video frame that includes the object). In some instances, the window of focus may be of a different color or shape from the PIP window. The device may allow the user to cycle through the objects in accordance with the list (e.g., the list 1402), where the objects 1-N are cycled through respective windows of focus. For example, as the user cycles, the object within the window of focus may be the next tracked object from a list (e.g., based on user input). The device may, upon reaching the end of a list, return to the beginning of the list, for example, as shown in FIG. 14. The position of the window of focus may be fixed (e.g., always in a corner of the screen) or may be floating (e.g., based on the location of the object highlighted by the window of focus).

The device may perform one or more PIP advanced features, such as, but not limited to, combining multiple PIP windows, splitting a PIP window into multiple PIP windows, freeze the content within a PIP window, enlarging or minimizing the content of a PIP window, providing a time delay to the content within the PIP window, incorporating social media into or along with the PIP window, repositioning a PIP window (e.g., based on user selection), and/or the like.

Figure 15A:
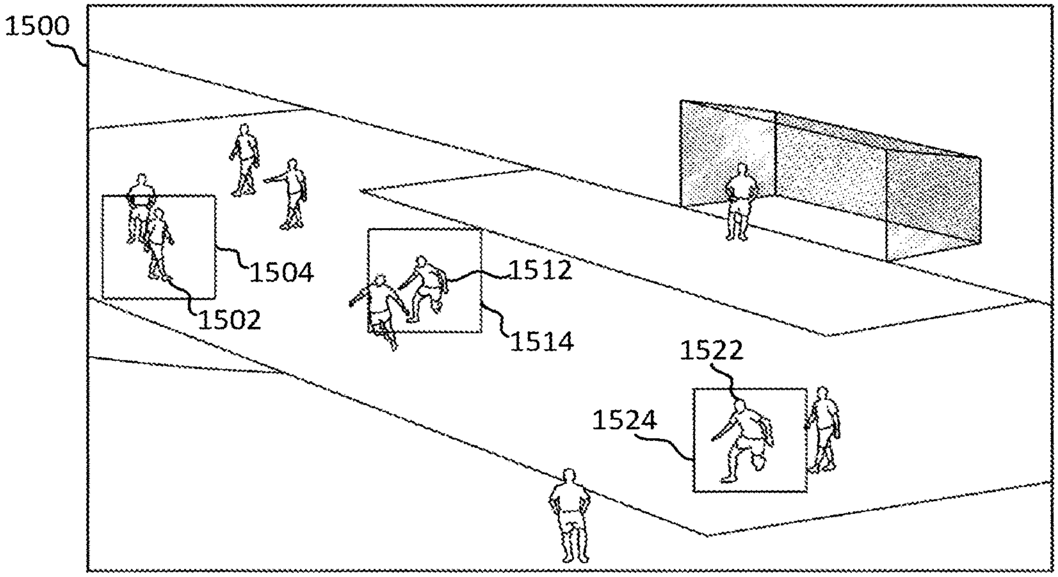
FIGS. 15A-F provide examples of combining multiple PIP windows for multiple tracked objects.
Figure 15B:
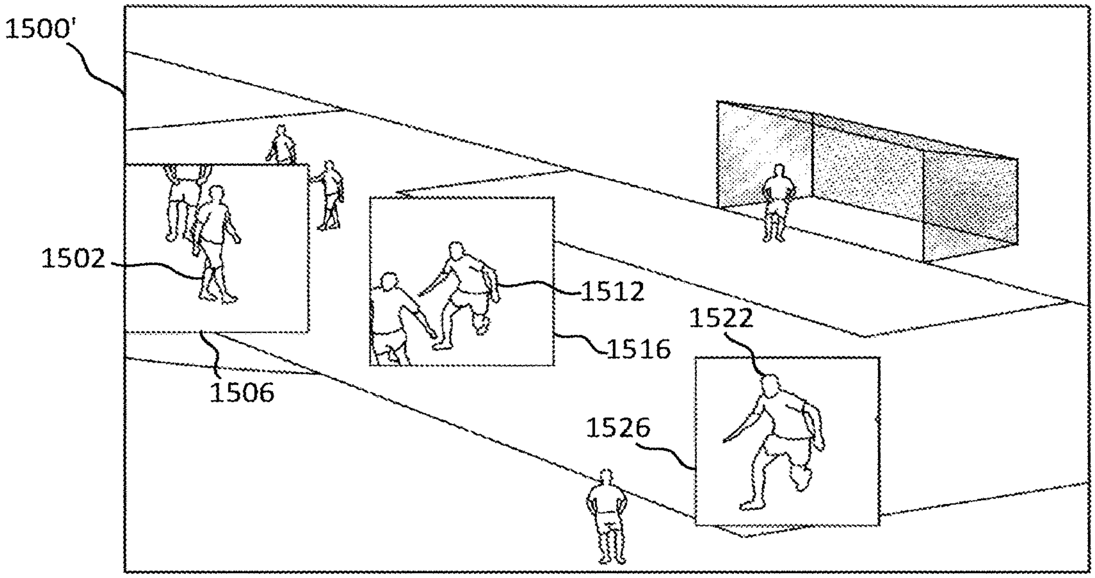
Figure 15C:
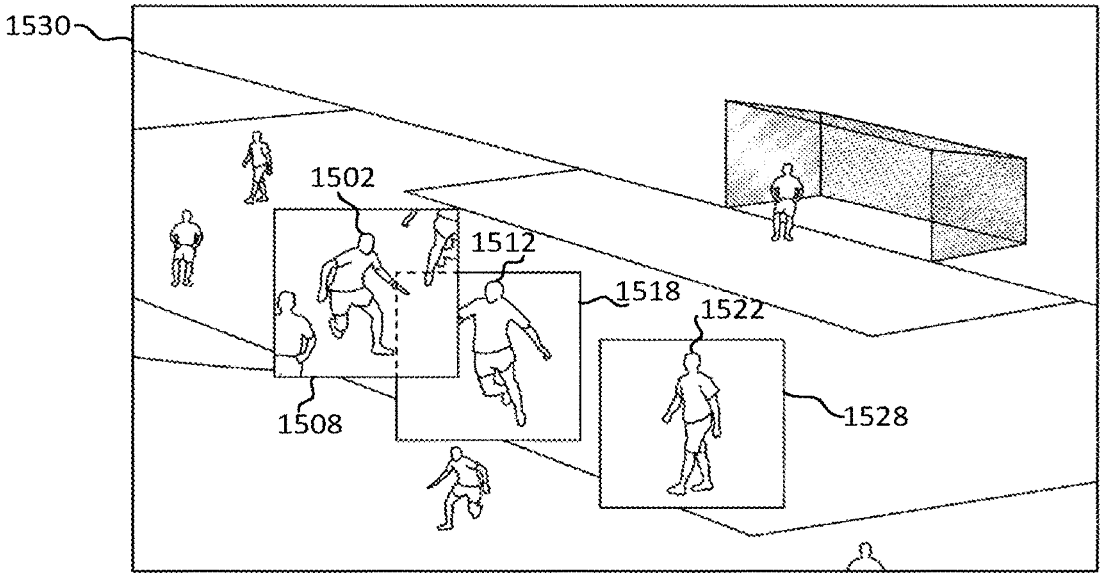
Figure 15D:
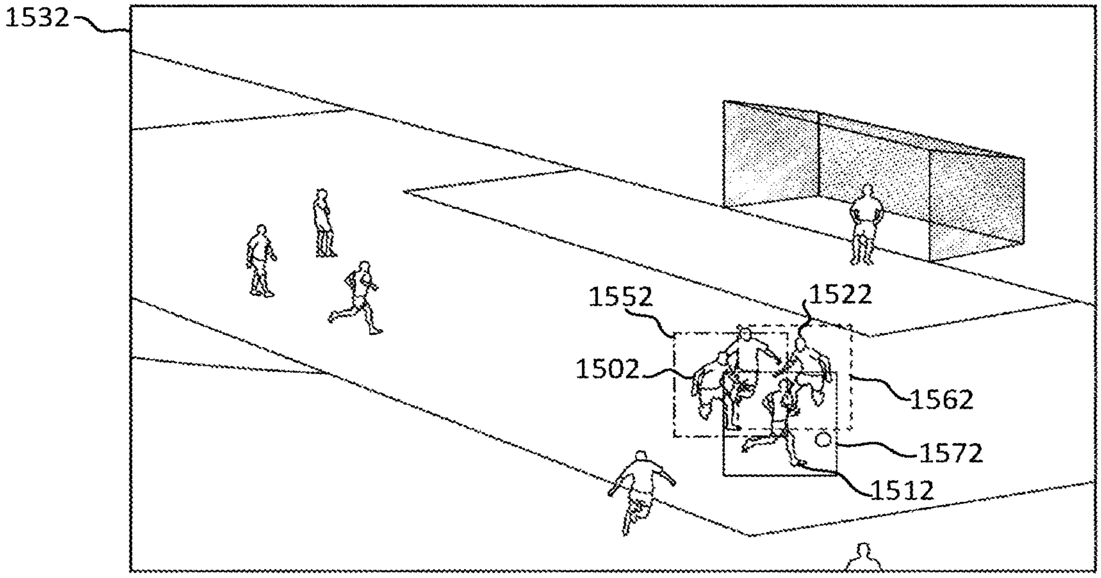
Figure 15E:
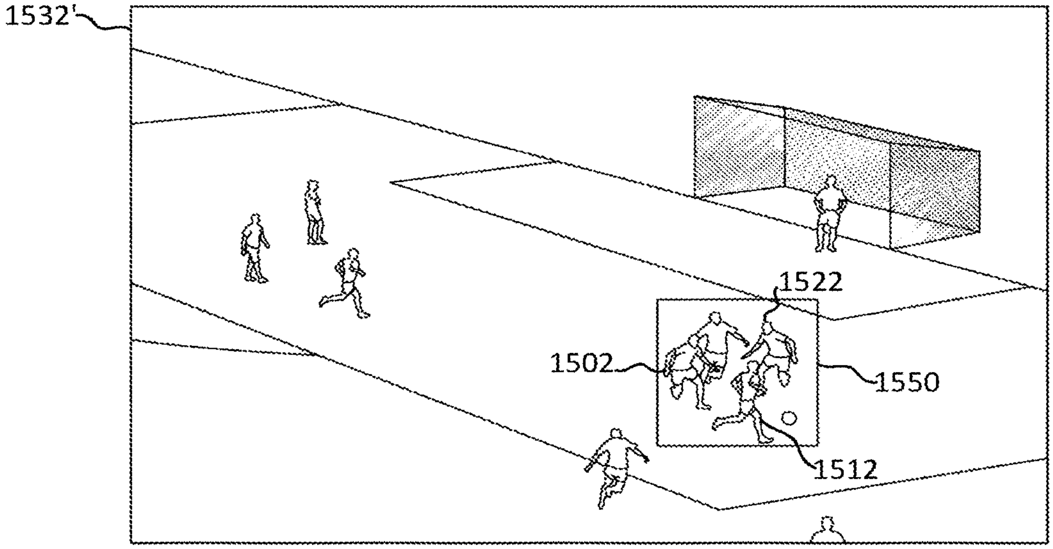
Figure 15F:
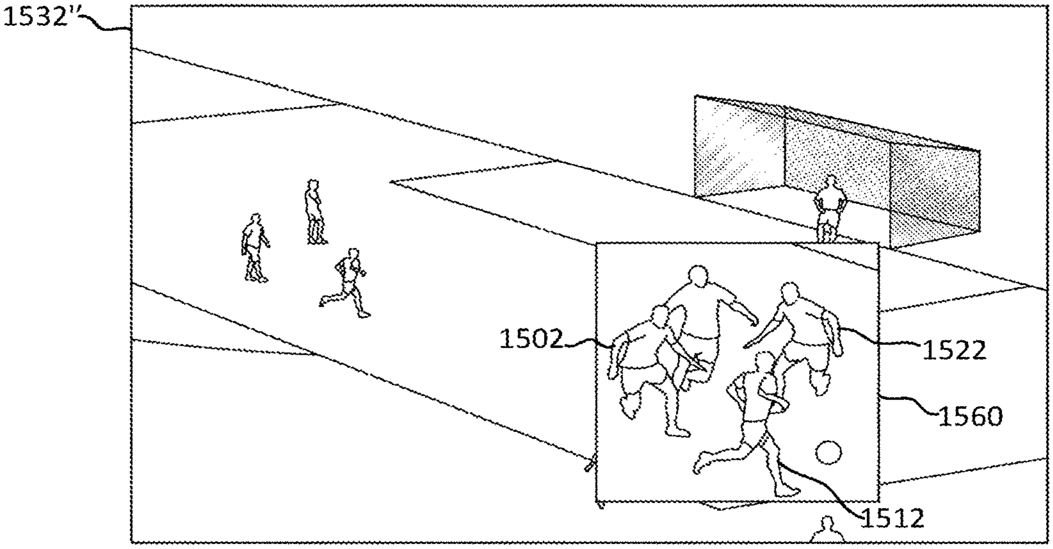

FIGS. 15A-F provide examples of combining multiple PIP windows for multiple tracked objects. FIG. 15A shows an example video frame 1500 that includes multiple tracked objects. FIG. 15B shows an example video frame 1500' that includes multiple zoom PIP windows corresponding to multiple tracked objects. FIG. 15C shows an example video frame 1530 that includes multiple zoom PIP windows that overlap as tracked objects become closer to one another. FIG. 15D shows an example of a video frame 1532 that includes multiple tracked objects that are overlapping one another. FIG. 15E shows an example video frame 1532' that includes a combined PIP window that includes multiple overlapping objects. FIG. 15F shows an example video frame 1532" that includes a combined PIP window that includes multiple overlapping objects.

The device may track multiple objects of interest across multiple video frames. The device may perform object tracking (e.g., identifying the objects and/or determining the locations of the objects within each video frame) using an object recognition technique (e.g., at the device) and/or based on metadata (e.g., that may be received as part of a video stream or broadcast). The device may select and/or may allow for a user to select multiple track objects for simultaneous display (e.g., zoomed or un-zoomed display). The device may display multiple PIP windows (e.g., floating or fixed PIP windows) for the multiple tracked objects. For example, referring to the video frame 1500 of FIG. 15A, the device may track objects 1502, 1512, 1522, and for each of the tracked objects 1502, 1512, 1522, the device may display a window around the object, such as the windows 1504, 1514, 1524. Further, the device may visually enlarge the portion of the frame that includes tracked objects within the windows. For example, the device may display a frame 1500' that includes a window 1506, 1516, 1526 that displays a visually enlarged portion of the video frame that includes the tracked object 1502, 1512, 1522, respectively. It should be appreciated that the location of the windows 1504, 1514, 1524 of FIG. 15A and the windows 1506, 1516, 1526 of FIG. 15B may be determined based on the location of each respective object 1502, 1512, 1522 (e.g., centered on top of the object, and move with the object across video frames).

The device may display multiple floating PIP windows (e.g., one for each tracked object) that move across video frames (i.e., that move as a plurality of video frames are displayed sequentially over time). For instance, the floating PIP windows may move independent of one another, according to the movement of the tracked objects associated with each of the floating PIP windows. In some instances, the PIP windows associated with the tracked objects may become close together or overlap as the tracked objects move over time (e.g., across video frames), which may occlude one or more PIP windows.

For example, referring to the video frame 1530 of FIG. 15C, the windows 1508 and 1518 that are associated with the objects 1502 and 1512, respectively, are overlapping, while the window 1528 associated with the object 1522 does not overlap another window. Two or more objects may become close and their floating PIP windows may (e.g., also) become close together or start to overlap. The device may merger the PIP windows of multiple tracked objects into a single, larger PIP window (e.g., a merged PIP window), which may include a zoomed view of multiple objects (e.g., the objects associated with combined PIP windows), for example, as shown in FIG. 15D-F.

Referring to the video frame 1532 of FIG. 15D, the device may tracking multiple objects 1502, 1512, 1522 who have windows 1552, 1562, 1572 (e.g., search windows or PIP windows) that overlap one another. The device may generate a merged PIP window that includes the respective tracked objects. For example, referring to video frame 1532' of FIG. 15E, the device may generate and display the merged PIP window 1550 that include the tracked objects 1502, 1512, 1522. The device may determine the location of the merged PIP window based on the locations of the tracked objects 1502, 1512, 1522 (e.g., such that the tracked objects 1502, 1512, 1522 are relatively centered within the PIP window). In some instances, the merged PIP window may display an enlarged portion of the video frame that includes the underlying tracked objects. For example, referring to the video frame 1532" of FIG. 15F, the device may generate and display the merged PIP window 1560 that includes a visually enlarged portion of the video frame 1532" that includes the tracked objects 1502, 1521, 1522. The merged PIP window may be floating (e.g., as shown in FIG. 15E-F) or may be fixed in a predetermined location (e.g., in a corner of the video frame). For example, as additional video frames are displayed, the merged PIP window may move with the corresponding tracked objects 1502, 1512, 1522.

The device may split the merged PIP window into two or more individual PIP windows if, for example, the one or more of the tracked objects 1502, 1512, 1522 move away from each other and their respective PIP windows no longer overlap if they were displayed as separate PIP windows (e.g., based on one or more proximity thresholds). If the PIP windows are floating, then after splitting, the PIP windows may (e.g., again) move independently according to the motion of underlying tracked objects 1502, 1512, 1522.

The device may use proximity thresholds, which may specify one or more degrees of closeness or separation of individual tracked objects (e.g., compare distance between object positions to a first distance threshold), for example, to determine whether to merge two or more corresponding floating PIP windows. Alternatively or additionally, the device may decide to merge PIP windows based on detection of overlap of displayed PIP windows. The device may use proximity thresholds, which may specify some degree of separation or closeness of individual tracked objects (e.g., compare distance between object positions to a second distance threshold), for example, when deciding whether to split a merged (e.g., floating) PIP window into two or more component PIP windows. Alternatively or additionally, the device may decide to split a merged (e.g., floating) PIP window, for example, based on a determination that two or more component PIP windows that would result from a split may (e.g., will) not overlap spatially within a video frame.

The device may perform a freeze and zoom of a video frame, for example, based on a user's command (e.g., selection of an object to be tracked and/or zoomed). For instance, the device may freeze a video frame, e.g., based on a user's command. A user may move the focus of zoom around the video frame. This feature may be useful, for example, while watching sports, enabling a user to stop the action and look around objects in the main window, for example, to study the position of players (e.g., in a field, on a court). The device may use a PIP window to show live video (e.g., to continue watching a video being broadcast), while another PIP window may be used for zooming in on a frozen video frame.

The device may display a time-delayed version of the object within a PIP window across multiple frames of the video content. The location of the PIP window within each frame may be fixed (e.g., predetermined and uncoupled to the location of the object within each frame) or may be based on the location of the object within each frame (e.g., "floating" across each video frame based on the location of the object, located within the closest corner to the object, etc.). Further, the time-delayed version of the object within the PIP window may be visually enlarged (e.g., along with the surrounding video frame captured by the PIP window). For example, the device may display a first PIP window that includes a portion of a video frame within (e.g., or overlapping) a temporally subsequent video frame. That is, in some instances, the device may display a PIP window with visually enlarged content on a delay (e.g., by a few seconds), for example, to permit a user to pay attention to a main window and view the PIP window after identifying an important play or scene. The location of the PIP window may be fixed within a predetermined location (e.g., such as a corner of the display). The device may save a window that includes the object across a number of frames (e.g., 120 frames, equivalent to 4 seconds in a 30 Hz TV broadcast) and may display subsequent video frames that includes the time-delayed PIP window with a delay (e.g., 4 seconds). In some example, the device may allow for a user to toggle the PIP window (e.g., the time-delayed PIP window) on/off.

The device may allow the content of a PIP window to be used with social media. For example, a user may want to share with friends something interesting from a TV broadcast. The device may allow the user to use a remote control to take a screenshot of a PIP window. The user may annotate a screenshot, draw over it, add effects, etc. The device may allow the user to share an original or modified (e.g., annotated) screenshot of a PIP window with others (e.g., via social media), for example, in a fair use context or in a promotional context. For example, content providers may want to enable users to share parts of their content for marketing purposes (e.g., create buzz about a new show or movie) or as part of a contest (e.g., vote for a favorite moment in a show or a favorite singer in a competition). The device may (e.g., to enable social media sharing) send a screenshot of the PIP window from a TV to a linked app in a mobile device, enabling a user to share it in social media.

The device may allow for the user to reposition the location of the PIP window (e.g., in the context of a fixed PIP window). For example, a user may be interested in information being shown at the bottom of a screen. The device may allow the user to move the position of a fixed PIP window to another part of the screen (e.g., to see information of interest). In some instances, the device may automatically determine to switch the location of the PIP window, for example, based on the current location of the tracked object (e.g., if the object gets too close to one corner, the device may switch the PIP window to another corner), based on information from the underlying video content (e.g., if the score of a game or player information is displayed in the bottom right, then the device may switch the location of the PIP window so to avoid overlapping that content), etc. Further, in some example, a user may use a remote control to activate a repositioning PIP feature. The device may move the PIP window to a new location, which may be indicated by a user. A new location may be a different fixed PIP window location (e.g., a different corner or edge of a display). A fixed PIP window may (e.g., alternatively or additionally) be converted to a 'floating' PIP window, which may be located based (e.g., centered) on a corresponding tracked object position.

Figure 16A:
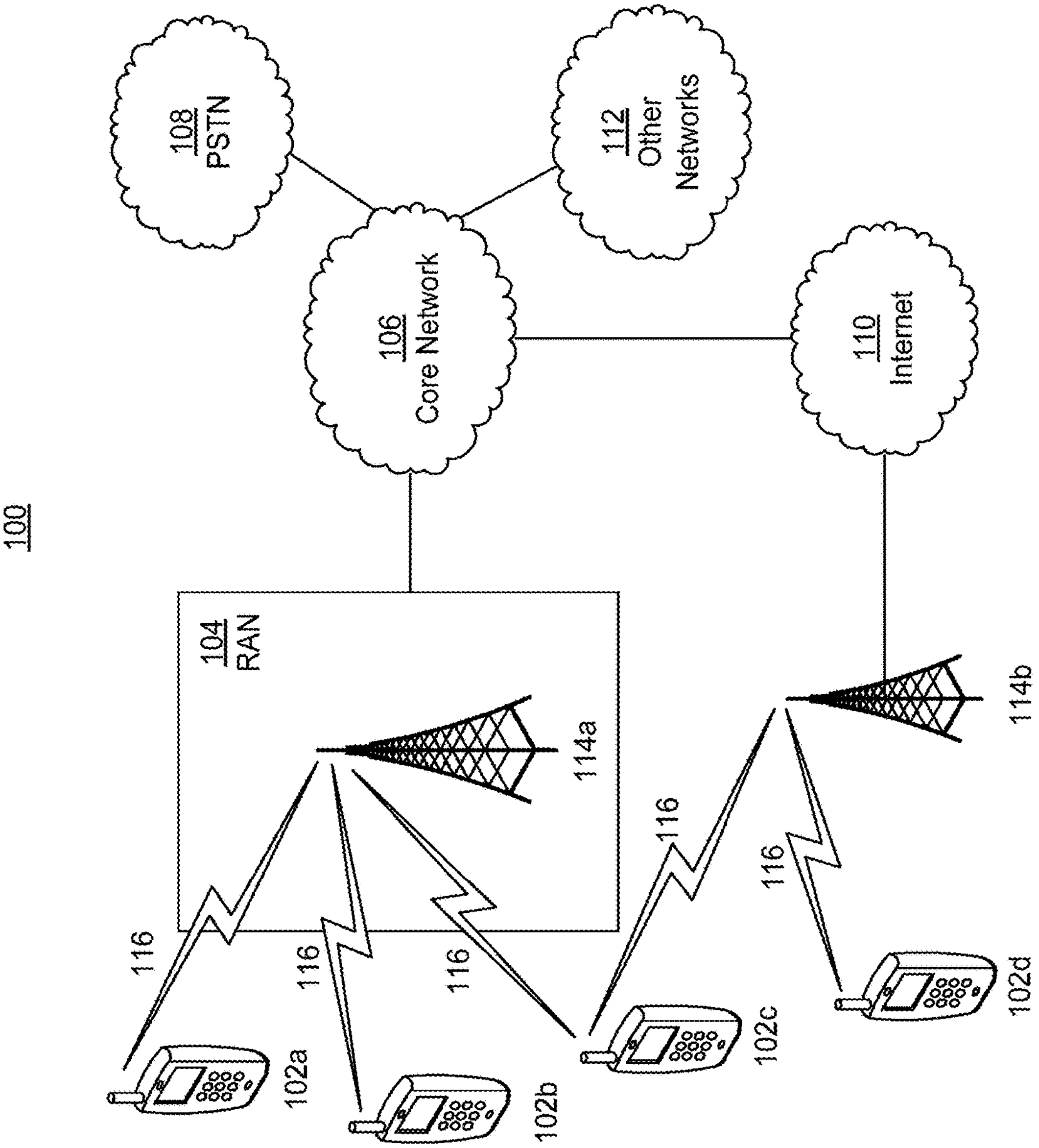
FIG. 16A is a system diagram illustrating an example communications system in which one or more disclosed embodiments may be implemented.

FIG. 16A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 16A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 16A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 16A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 16A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 16A may be configured to communicate with the base station 114*a*, which may employ a cellular-based radio technology, and with the base station 114*b*, which may employ an IEEE 802 radio technology.

Figure 16B:
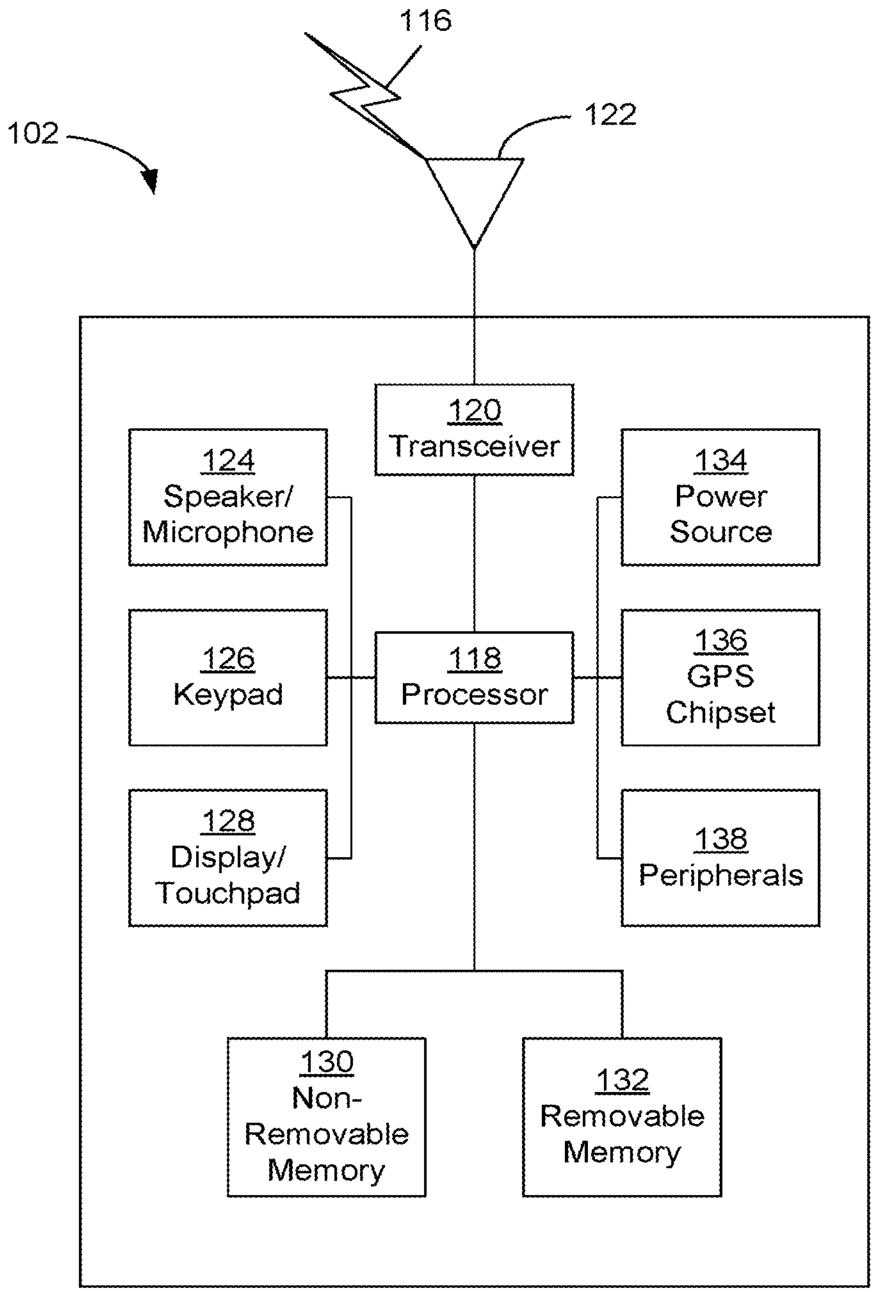
FIG. 16B is a system diagram illustrating an example wireless transmit/receive unit (WTRU) that may be used within the communications system illustrated in FIG. 16A according to an embodiment.

FIG. 16B is a system diagram illustrating an example WTRU 102. As shown in FIG. 16B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 16B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 16B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception))

Figure 16C:
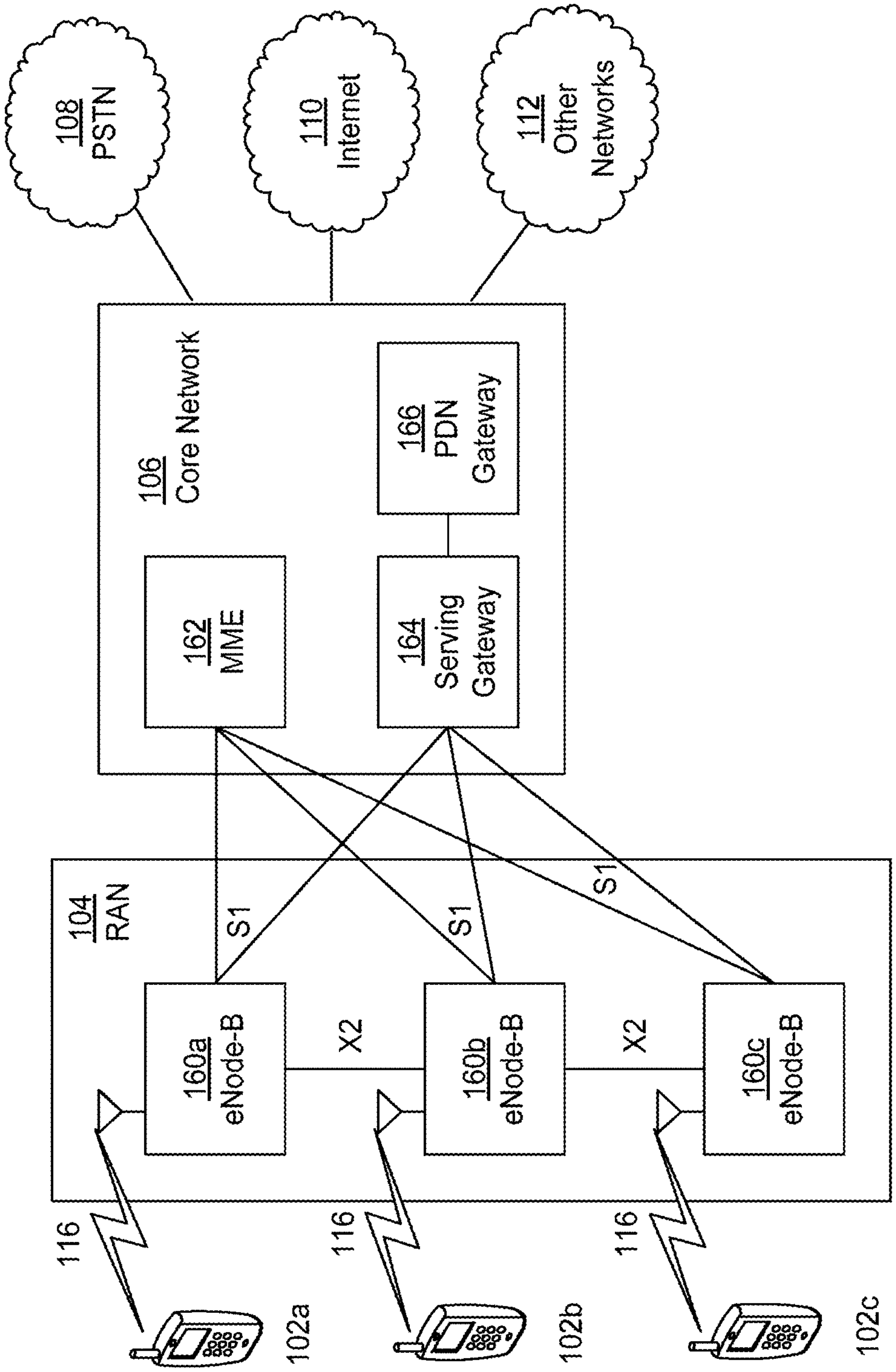
FIG. 16C is a system diagram illustrating an example radio access network (RAN) and an example core network (CN) that may be used within the communications system illustrated in FIG. 16A according to an embodiment.

FIG. 16C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 16C, the eNode-Bs 160*a*, 160*b*, 160*c* may communicate with one another over an X2 interface.

The CN 106 shown in FIG. 16C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers Although the WTRU is described in FIGS. 16A-16D as a wireless terminal, it is contemplated that in certain representative embodiments that such a terminal may use (e.g., temporarily or permanently) wired communication interfaces with the communication network.

In representative embodiments, the other network 112 may be a WLAN

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS High Throughput (HT) STAs may use a 40 MHz wide channel for communication, for example, via a combination of the primary 20 MHz channel with an adjacent or nonadjacent 20 MHz channel to form a 40 MHz wide channel Very High Throughput (VHT) STAs may support 20 MHz, 40 MHz, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHZ channels, and the data may be transmitted by a transmitting STA. At the receiver of the receiving STA, the above described operation for the 80+80 configuration may be reversed, and the combined data may be sent to the Medium Access Control (MAC)

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life)

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHz, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 16D:
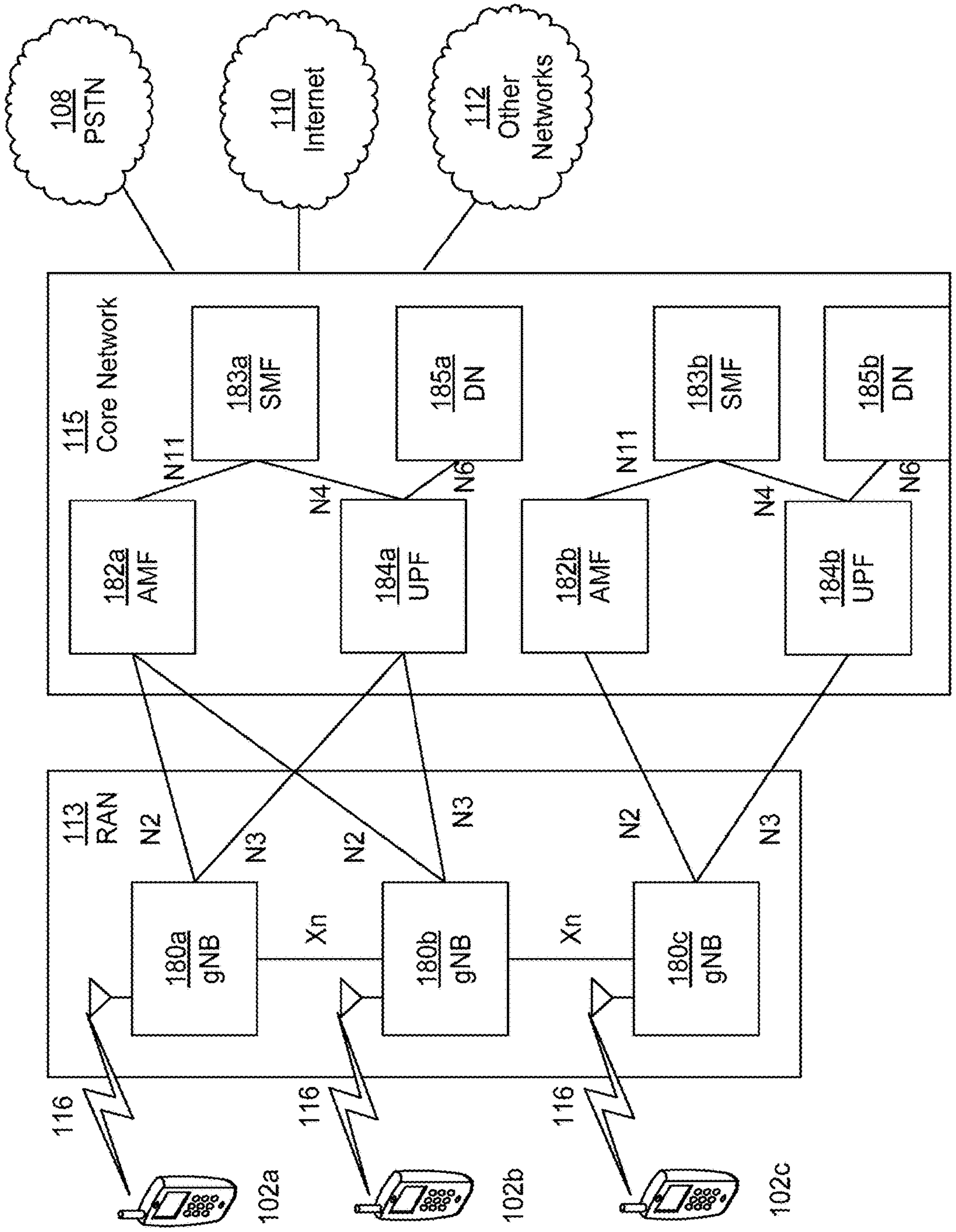
FIG. 16D is a system diagram illustrating a further example RAN and a further example CN that may be used within the communications system illustrated in FIG. 16A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 16D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 16D, the gNBs 180*a*, 180*b*, 180*c* may communicate with one another over an Xn interface.

The CN 115 shown in FIG. 16D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities have been disclosed for tracked video zooming. Client-side (on-device) or local tracking may permit users to select arbitrary objects for tracking and zooming. Tracking metadata may be provided (e.g., a video broadcast may contain metadata describing locations of objects in video frames), for example, in addition to or as an alternative to client-side tracking. Metadata may contain enhanced information about tracked objects. A user may interact with an object shown (e.g., in PIP) to obtain additional information. Video zooming (e.g., in a PIP) may be provided in a fixed location and/or a floating location (e.g., moving with a tracked object). Multiple objects may be simultaneously tracked and zoomed (e.g., in multiple PIPs). A user may cycle through and select among multiple tracked objects (e.g., to switch an object being tracked and zoomed in PIP). PIP zoom may be provided with advanced features, e.g., combining multiple PIP windows, splitting a PIP window, freeze and zoom, time delay zoom, PIP and social media, and repositioning PIP.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for generating a picture-in-picture (PIP) window for displaying on a display device, the method comprising:

determining a position of a tracked object within a video frame of a plurality of video frames of a video content;

generating a floating PIP window for displaying on the display device, wherein the floating PIP window comprises at least a magnified view of the tracked object, and wherein the position of the floating PIP window follows the position of the tracked object as the tracked object moves around screen of the display device across the plurality of video frames; and displaying the floating PIP window on the display device.

2. The method of claim 1, wherein the floating PIP window occludes at least the tracked object.

3. The method of claim 1, wherein the tracked object within the video frame is selected based on a user selection.

4. The method of claim 1, wherein the position of the tracked object is determined based on object recognition or metadata.

5. The method of claim 1, further comprising:

identifying a plurality of objects within the video frame of the video content;

selecting at least two objects from the plurality of objects for tracking, wherein the selected at least two objects include the tracked object;

generating at least two floating PIP windows for displaying on the display device, wherein each floating PIP window comprises a magnified version of a respective object and occludes that object; and cycling through the at least two floating PIP windows.

6. The method of claim 5, wherein the at least two objects are selected based on a user selection.

7. The method of claim 5, wherein each of the at least two floating PIP windows corresponds to a respective object among the at least two objects that move independently within the video frame.

8. The method of claim 5, further comprising:

determining that two of the at least two floating PIP windows overlap; and generating a larger floating PIP window for displaying on the display device, wherein the larger floating PIP window is generated based on the two of the at least two floating PIP windows, wherein the larger floating PIP window comprises magnified versions of two objects of the at least two objects, and wherein the larger floating PIP window moves together with the two objects.

9. The method of claim 8, further comprising:

determining that two of the at least two floating PIP windows do not overlap; and splitting the larger floating PIP window into two independent floating PIP windows for displaying on the display device.

10. The method of claim 1, wherein the floating PIP window is displayed on top of the tracked object.

11. A display device comprising:

a processor configured to:

determine a position of a tracked object within a video frame of a plurality of video frames of a video content;

generate a floating picture-in-picture (PIP) window for displaying on the display device, wherein the floating PIP window comprises at least a magnified view of the tracked object, and wherein the position of the floating PIP window follows the position of the tracked object as the tracked object moves around screen of the display device across the plurality of video frames; and display the floating PIP window on the display device.

12. The display device of claim 11, wherein the floating PIP window occludes at least the tracked object.

13. The display device of claim 11, wherein the tracked object within the video frame is selected based on a user selection.

14. The display device of claim 11, wherein the position of the tracked object is determined based on object recognition or metadata.

15. The display device of claim 11, wherein the processor is configured to:

identify a plurality of objects within the video frame of the video content;

select at least two objects from the plurality of objects for tracking, wherein the selected at least two objects include the tracked object;

generate at least two floating PIP windows for displaying on the display device, wherein each floating PIP window comprises a magnified version of a respective object and occludes that object; and cycle through the at least two floating PIP windows.

16. The display device of claim 15, wherein the at least two objects are selected based on a user selection.

17. The display device of claim 15, wherein each of the at least two floating PIP windows corresponds to a respective object among the at least two objects that move independently within the video frame.

18. The display device of claim 15, wherein the processor is configured to:

determine that two of the at least two floating PIP windows overlap; and generate a larger floating PIP window for displaying on the display device, wherein the processor being configured to generate the larger floating PIP window comprises the processor being configured to generate the larger floating PIP window based on the two of the at least two floating PIP windows, wherein the larger floating PIP window comprises magnified versions of two objects of the at least two objects, and wherein the larger floating PIP window moves together with the two objects.

19. The display device of claim 18, wherein the processor is configured to:

determine that two of the at least two floating PIP windows do not overlap; and split the larger floating PIP window into two independent floating PIP windows for displaying on the display device.

20. The display device of claim 11, wherein the processor is configured to display the floating PIP window on top of the tracked object.

* * * * *